United States Patent
Asano et al.

(10) Patent No.: US 9,753,207 B2
(45) Date of Patent: Sep. 5, 2017

(54) LIGHT GUIDE PLATE, SURFACE LIGHT SOURCE DEVICE, TRANSMISSIVE DISPLAY DEVICE

(71) Applicant: Dai Nippon Printing Co., Ltd., Tokyo (JP)

(72) Inventors: Eiji Asano, Tokyo (JP); Daijirou Kodama, Tokyo (JP); Kazuki Matsumoto, Tokyo (JP); Keiko Kitano, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/303,853

(22) PCT Filed: Feb. 10, 2016

(86) PCT No.: PCT/JP2016/054002
§ 371 (c)(1),
(2) Date: Oct. 13, 2016

(87) PCT Pub. No.: WO2016/132997
PCT Pub. Date: Aug. 25, 2016

(65) Prior Publication Data
US 2017/0131455 A1 May 11, 2017

(30) Foreign Application Priority Data

Feb. 20, 2015 (JP) .................. 2015-032155
Sep. 15, 2015 (JP) .................. 2015-181359

(51) Int. Cl.
*F21V 7/04* (2006.01)
*F21V 8/00* (2006.01)

(52) U.S. Cl.
CPC ......... *G02B 6/0036* (2013.01); *G02B 6/0038* (2013.01); *G02B 6/0053* (2013.01)

(58) Field of Classification Search
CPC .. G02B 6/0033; G02B 6/0035; G02B 6/0036; G02B 6/0038; G02B 6/0053
(Continued)

(56) References Cited

U.S. PATENT DOCUMENTS

| 2004/0264911 A1 | 12/2004 | Toeda et al. |
| 2014/0119048 A1 | 5/2014 | Ishida et al. |

(Continued)

FOREIGN PATENT DOCUMENTS

| CN | 1576910 A | 2/2005 |
| JP | 2012-003883 A1 | 1/2012 |

(Continued)

OTHER PUBLICATIONS

International Search Report and Written Opinion (Application No. PCT/JP2016/054002) dated May 17, 2016.
(Continued)

*Primary Examiner* — Jason Moon Han
(74) *Attorney, Agent, or Firm* — Burr & Brown, PLLC

(57) ABSTRACT

A light guide plate having light-emitting-side unit optical shapes arranged on a light emitting surface in a direction perpendicular to a light guide direction and a thickness direction of the light guide plate. The optical shape extends in the light guide direction and has a groove shape recessed in the light emitting surface, and a bottom of the groove is formed on a surface which is concave toward the back surface side. Inclined surfaces which are inclined from an edge portion toward the bottom side are formed in two end portions of the concave surface in an arrangement direction. When a width of the optical shape in the arrangement direction is W21, a maximum inclination angle θ of the inclined surface relative to the light emitting surface satisfies 20°≤θ≤45°, and a radius of curvature r of the concave surface satisfies r≥W21/(4×sin θ).

9 Claims, 19 Drawing Sheets

(58) Field of Classification Search
USPC .................................. 362/617–620, 623–626
See application file for complete search history.

(56) References Cited

U.S. PATENT DOCUMENTS

2014/0140095 A1    5/2014  Yuki et al.
2015/0029745 A1    1/2015  Asano et al.

FOREIGN PATENT DOCUMENTS

| JP | 2015-026543 A1 | 2/2015 |
| WO | 2013/002015 A1 | 1/2013 |
| WO | 2013/005542 A1 | 1/2013 |

OTHER PUBLICATIONS

Japanese Office Action (Application No. 2015-032155) dated Jul. 19, 2016.
Japanese Office Action (Application No. 2015-181359) dated Jul. 19, 2016.
Japanese Office Action (Application No. 2015-032155) dated Sep. 6, 2016.
Chinese Office Action (Application No. 2016800000733.2) dated Apr. 10, 2017 (with English translation).

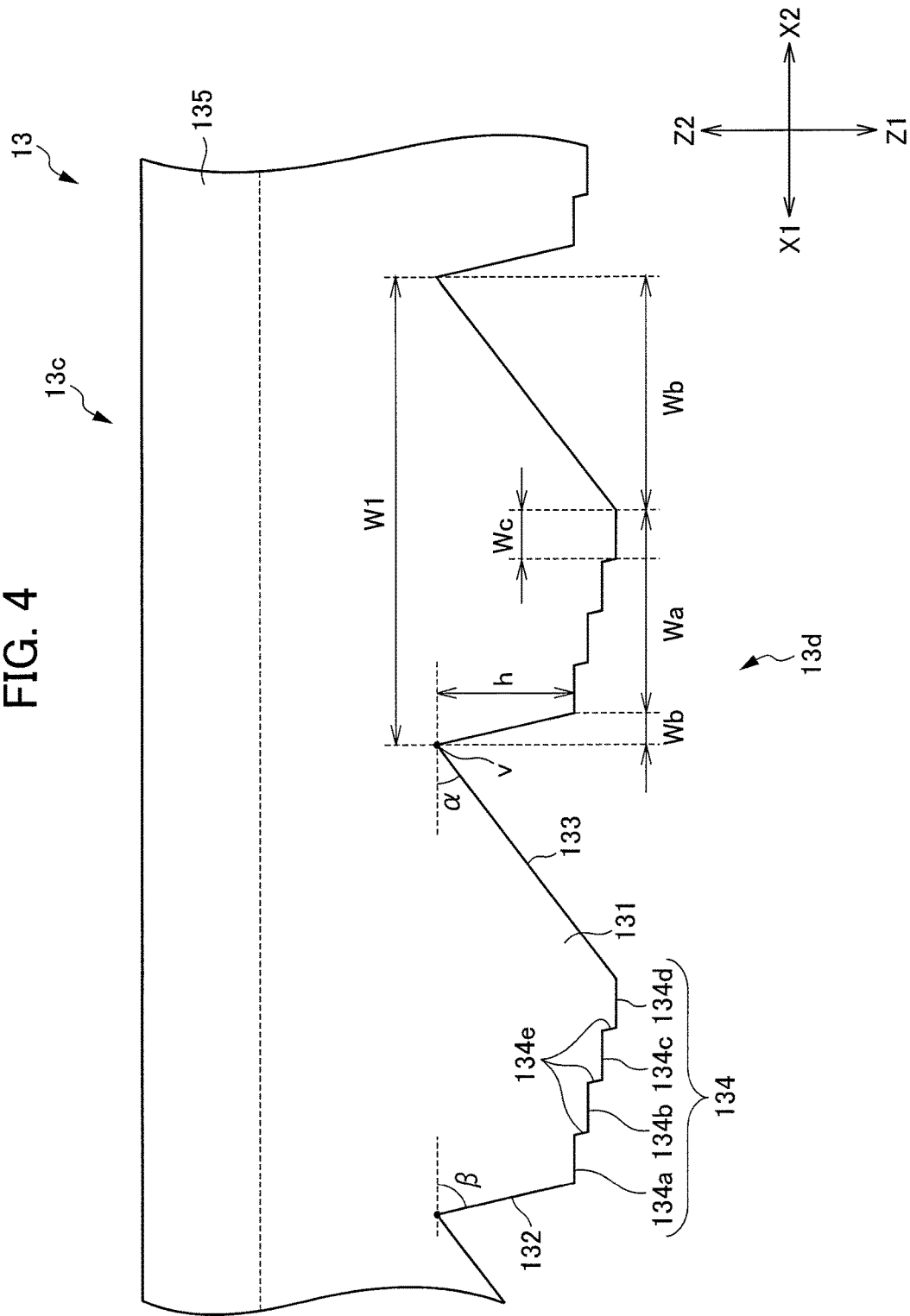

FIG. 14

| | TEST SPECIMEN 1 | TEST SPECIMEN 2 | TEST SPECIMEN 3 | TEST SPECIMEN 4 | TEST SPECIMEN 5 | TEST SPECIMEN 6 |
|---|---|---|---|---|---|---|
| APEX ANGLE ε OF DEFLECTION OPTICAL SHEET [DEGREES] | 58.5 | 58.5 | 58.5 | 58.5 | 58.5 | 58.5 |
| WIDTH W23 OF FLAT PORTION [μm] | 0 | 0.5 | 1.5 | 2 | 2.5 | 3.6 |
| NUMBER OF OCCURRENCES OF SCRATCHES OR THE LIKE [NUMBER] | 3 | 0 | 0 | 0 | 0 | 0 |
| HOT SPOT | ○ | ○ | ○ | ○ | △ | × |
| OVERALL EVALUATION | × | ◎ | ◎ | ◎ | ○ | ○ |

| | TEST SPECIMEN 7 | TEST SPECIMEN 8 | TEST SPECIMEN 9 | TEST SPECIMEN 10 | TEST SPECIMEN 11 | TEST SPECIMEN 12 |
|---|---|---|---|---|---|---|
| APEX ANGLE ε OF DEFLECTION OPTICAL SHEET [DEGREES] | 68.1 | 68.1 | 68.1 | 68.1 | 68.1 | 68.1 |
| WIDTH W23 OF FLAT PORTION [μm] | 0 | 0.5 | 1.5 | 2 | 2.5 | 3.6 |
| NUMBER OF OCCURRENCES OF SCRATCHES OR THE LIKE [NUMBER] | 2 | 0 | 0 | 0 | 0 | 0 |
| HOT SPOT | ○ | ○ | ○ | ○ | △ | × |
| OVERALL EVALUATION | × | ◎ | ◎ | ◎ | ○ | ○ |

| | TEST SPECIMEN 13 | TEST SPECIMEN 14 | TEST SPECIMEN 15 | TEST SPECIMEN 16 | TEST SPECIMEN 17 | TEST SPECIMEN 18 |
|---|---|---|---|---|---|---|
| APEX ANGLE ε OF DEFLECTION OPTICAL SHEET [DEGREES] | 75.0 | 75.0 | 75.0 | 75.0 | 75.0 | 75.0 |
| WIDTH W23 OF FLAT PORTION [μm] | 0 | 0.5 | 1.5 | 2 | 2.5 | 3.6 |
| NUMBER OF OCCURRENCES OF SCRATCHES OR THE LIKE [NUMBER] | 2 | 0 | 0 | 0 | 0 | 0 |
| HOT SPOT | ○ | ○ | ○ | ○ | △ | × |
| OVERALL EVALUATION | × | ◎ | ◎ | ◎ | ○ | ○ |

LIGHT GUIDE PLATE, SURFACE LIGHT SOURCE DEVICE, TRANSMISSIVE DISPLAY DEVICE

TECHNICAL FIELD

The present invention relates to a light guide plate, a surface light source device, and a transmissive display device.

BACKGROUND ART

In the related art, a transmissive display device is known of which displays an image by illuminating a transmissive display unit such as an LCD (Liquid Crystal Display) panel from a back surface thereof with a surface light source device (backlight). The surface light source devices are mainly classified into direct-type surface light source devices where a light source is arranged just under various optical members, such as an optical sheet, and edge-type surface light source devices where a light source is arranged on a side surface side of optical members. Among the surface light source devices, since the light source is arranged in the side surface side of the optical members such as a light guide plate, the edge-type surface light source device has an advantage of being capable of being thinned further in comparison with the direct-type surface light source device, and thus, in recent years, the edge-type surface light source device has become widely used.

In general, in an edge-type surface light source device, a light source is arranged at a position facing a light incident surface which is a side surface of a light guide plate, light emitted by the light source is incident from the light incident surface on the light guide plate, and the light propagates from the light incident surface toward the surface side facing the light incident surface in a direction (light guide direction) perpendicular to the light incident surface while being repeatedly reflected by a light emitting surface and a back surface facing the light emitting surface. In addition, by changing the light propagation direction by a diffusion pattern, a prism shape, or the like provided on the back surface of the light guide plate, the light emits and propagates gradually from the positions along the light guide direction of the light emitting surface toward the LCD panel side (for example, Patent Document 1).

Patent Document 1: Japanese Unexamined Patent Application, Publication No. 2012-3883

DISCLOSURE OF THE INVENTION

Problems to be Solved by the Invention

In the invention disclosed in Patent Document 1, unit optical shapes which are convex toward a light emitting surface of a light guide plate and extend in a light guide direction are formed, and a cross-sectional shape of the unit optical shape on a cross section perpendicular to the light guide direction is formed as a pentagonal shape, so that in-plane non-uniformity of brightness in the vicinity of the light incident surface side of the display surface is not conspicuous. However, in the case where such unit optical shapes are formed on the light emitting surface of the light guide plate, since directionality of the light inside the light guide plate is easily maintained, due to color irregularity or luminance irregularity in the LED used for the light source, in some cases, streaky irregularity may be observed in the central portion of the light emitting surface, or luminance irregularity (hot spot) may be observed in the vicinity of the light incident surface side.

The invention is to provide a light guide plate, a surface light source device, and a transmissive display device capable of preventing streaky irregularity and hot spot from occurring.

Means for Solving the Problems

The invention solves the problems by the means for solving as follows. In addition, for better understanding, reference numerals corresponding to those of the embodiment of the invention are attached in the description, but the invention is not limited thereto. The invention of claim 1 is a light guide plate (13) having a light incident surface (13*a*) on which light is incident, a light emitting surface (13*c*) which intersects the light incident surface and emits light, and a back surface (13*d*) which faces the light emitting surface, the light guide plate emitting the light from the light emitting surface while guiding the incident light from the light incident surface in a light guide direction, wherein a plurality of light-emitting-side unit optical shapes (135) are arranged in the light emitting surface in a direction which is perpendicular to the light guide direction and is perpendicular to a thickness direction of the light guide plate, wherein the light-emitting-side unit optical shape extends in the light guide direction and is formed in a groove shape which is recessed from the light emitting surface, and a bottom (135*c*) of the groove shape is formed on a concave surface (135*a*) which is concave toward the back surface side, wherein inclined surfaces (135*b*) which are inclined from an edge portion where recessing from the light emitting surface is started toward the bottom side are formed in two end portions of the concave surface in an arrangement direction, and wherein, when a width of the light-emitting-side unit optical shape in the arrangement direction is denoted by W21, a maximum inclination angle θ of the inclined surface with respect to the light emitting surface satisfies 20°≤θ≤45°, and a radius of curvature r of the concave surface satisfies r≥W21/(4×sin θ). The invention of claim 2 is the light guide plate (13) according to claim 1, wherein a ratio R=W22/W21 of a width W22 of the concave surface to the width W21 of the light-emitting-side unit optical shape in the arrangement direction of the light-emitting-side unit optical shape is 50%≤R≤80%. The invention of claim 3 is the light guide plate (13) according to claim 1 or 2, wherein a flat portion (136) which is substantially parallel to the light emitting surface is provided between the adjacent light-emitting-side unit optical shapes (135). The invention of claim 4 is the light guide plate (13) according to claim 3, wherein a width W23 of the flat portion (136) in the arrangement direction of the light-emitting-side unit optical shape (135) is 0.5 μm≤W23≤2.5 μm. The invention of claim 5 is the light guide plate (13) according to claim 4, wherein the width W23 of the flat portion (136) in the arrangement direction of the light-emitting-side unit optical shape (135) is 0.5 μm≤W23≤2.0 μm. The invention of claim 6 is the light guide plate (13) according to any one of claims 3 to 5, where a portion of a plurality of the flat portions (136) are different from other flat portions in a thickness direction in terms of height. The invention of claim 7 is the light guide plate according to any one of claims 1 to 6, wherein a plurality of back-surface-side unit optical shapes (131) are arranged on the back surface (13*d*) in the light guide direction, wherein the back-surface-side unit optical shape is convex toward a back surface side and includes a first inclined surface portion (132) which is located in the light incident surface (13a), a second inclined surface portion (133) which is located in the other side facing the first inclined surface portion to totally reflect at least a portion of the incident light, and a top surface portion (134) which is located between the first inclined surface portion and the second inclined surface portion, and wherein the top surface portion includes a contact portion (134d) which is in contact with a reflection member which is arranged on the back surface side of the light guide plate. The invention of claim 8 is a surface light source device (10) including: the light guide plate (13) according to any one of claims 1 to 7; a light source unit (12) which is provided at a position facing the light incident surface (13a) of the light guide plate and emits light to the light incident surface; and a deflection optical sheet (15) which is arranged on a light emitting surface side of the light guide plate and has a deflection function of deflecting light emitted from the light guide plate to a normal direction of a sheet surface thereof or a direction where an angle with respect to the normal direction is to be decreased. The invention of claim 9 is a transmissive display device (1) including: the surface light source device (10) according to claim 8; and a transmissive display unit (11) which is illuminated from a back surface side by the surface light source device.

Effects of the Invention

According to the invention, it is possible to achieve an effect capable of providing a light guide plate, a surface light source device, and a transmissive display device capable of preventing streaky irregularity and hot spot from occurring.

BRIEF DESCRIPTION OF THE DRAWINGS

FIG. 4 is a diagram illustrating a back-surface-side unit optical shape 131 according to the first embodiment.

FIG. 14 is a diagram illustrating a summary of results of evaluation of test specimens.

PREFERRED MODE FOR CARRYING OUT THE INVENTION

Hereinafter, embodiments of the invention will be described with reference to the drawings and the like. Each figure including FIG. 1 described hereinafter is a schematic diagram for illustration, and for better understanding, the sizes and shapes of components are appropriately exaggerated. In this specification, the terms of a plate, a sheet, and the like are used. As a general usage of these terms, the order of a plate, a sheet, and a film are used as the order of thickness, and in this specification, this order of thickness is used. However, this distinguished usage has no technical meaning, and these terms may be appropriately replaced. Numerical values such as sizes and names of materials of components disclosed in this specification are examples as embodiments. The invention is not limited thereto, but the numerical values and the names of materials may be appropriately selected for use. It should be noted that, in this specification, terms specifying shapes or geometrical conditions, for example, the terms parallel, perpendicular, or the like include states exhibiting the same optical function and having some degrees of error which can be regarded as parallel and perpendicular as well as exact meanings thereof. It should be noted that, in this specification, a sheet surface (plate surface, film surface) denotes a surface in a plane direction of each sheet (plate, film) as the sheet (plate, film) is viewed as a whole.

First Embodiment

Figure 1:
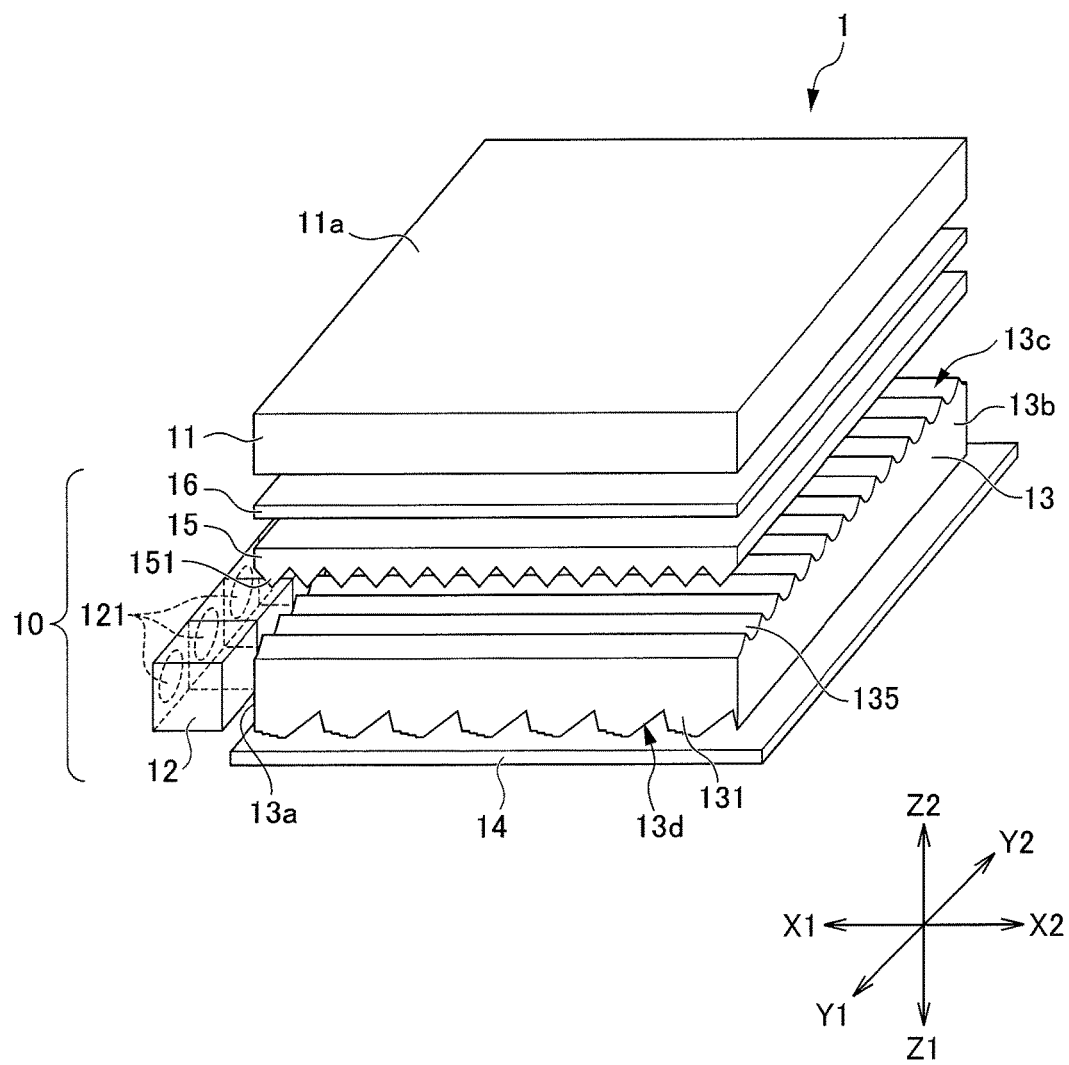
FIG. 1 is a diagram illustrating a transmissive display device 1 according to a first embodiment.

FIG. 1 is a diagram illustrating a transmissive display device 1 according to an embodiment. The transmissive display device 1 according to the embodiment is configured to include an LCD panel 11 and a surface light source device 10. The transmissive display device 1 performs illumination on the LCD panel 11 from a back surface side thereof to a surface light source device 10 to display image information formed on the LCD panel 11. For better understanding in the following figures including FIG. 1 and the following description, in a use state of the transmissive display device 1, two directions which are parallel to a screen of the transmissive display device 1 and are perpendicular to each other are defined as an X direction (X1-X2 direction) and a Y direction (Y1-Y2 direction), and a direction that is perpendicular to the screen of the transmissive display device 1 is defined as a Z direction (Z1-Z2 direction). In the Z direction, a Z1 side is a back surface side, and a Z2 side is an observer side. In the embodiment, the screen of the transmissive display device 1 corresponds to a surface (hereinafter referred to as a display surface) 11a of the LCD panel 11 that is closest to an observer, and a "front direction" of the transmissive display device 1 is a normal direction of the display surface 11a, is parallel to the Z direction, and is coincident with a normal direction of a sheet surface of the later-described prism sheet 15 or a normal direction of a plate surface of the light guide plate 13 or the like.

The LCD panel 11 is formed with transmissive liquid crystal display elements and a transmissive display unit where image information is formed on the display surface thereof. The LCD panel 11 has a substantially flat shape. Each of the outer appearance of the LCD panel 11 and the display surface 11a has a rectangular shape as viewed from the Z direction and has two facing sides parallel to the X direction and two facing sides parallel to the Y direction.

The surface light source device 10 is a device that performs illumination on the LCD panel 11 from the back surface side and is configured to include a light source unit 12, a light guide plate 13, a reflection sheet 14, a prism sheet 15, and a light diffusion sheet 16. The surface light source device 10 is a so-called edge-type surface light source device (backlight). Each of the light guide plate 13, the reflection sheet 14, the prism sheet 15, the light diffusion sheet 16, and the like constituting the surface light source device 10 has a rectangular shape as viewed from the front direction (Z direction) and has two facing sides parallel to the X direction and two facing sides parallel to the Y direction.

The light source unit 12 is a component that emits light for illumination on the LCD panel 11. The light source unit 12 is arranged in the Y direction at a position facing a light incident surface 13a which is an end surface of the one side (X1 side) of the X direction of the light guide plate 13. In the light source unit 12, a plurality of point light sources 121 are formed to be arranged at a predetermined interval in the Y direction. The point light source 121 employs an LED (Light Emitting Diode) light source. In addition, the light source unit 12 may be a linear light source, such as a cold cathode tube, or may be a form where a light source is provided to an end surface of a light guide extending in the Y direction. In addition, from the point of view of improving utilization efficiency of light emitted by the light source unit 12, a reflection plate (not shown) may be provided so as to cover the outside of the light source unit 12.

The light guide plate 13 is a substantially flat-shaped member that guides light. In the embodiment, the light incident surface 13a and a counter surface 13b are located at two end portions (X1 side end portion and X2 side end portion) of the light guide plate 13 in the X direction and are two sides extending in parallel to the Y direction as viewed from the normal direction (Z direction) of a plate surface. The plate surface of the light guide plate 13 is defined as a surface that is parallel to the XY plane, and the light emitting surface 13c is defined as being parallel to the plate surface. The light guide plate 13 allows the light emitted by the light source unit 12 to be incident on the light incident surface 13a and to be totally reflected on the light emitting surface 13c and the back surface 13d and allows the light to be appropriately emitted from the light emitting surface 13c toward the prism sheet 15 side (Z2 side) while guiding the light toward the counter surface 13b side (X2 side) facing the light incident surface 13a, mainly in the X direction. Hereinafter, the components of the light guide plate 13 will be described.

Figure 2A:
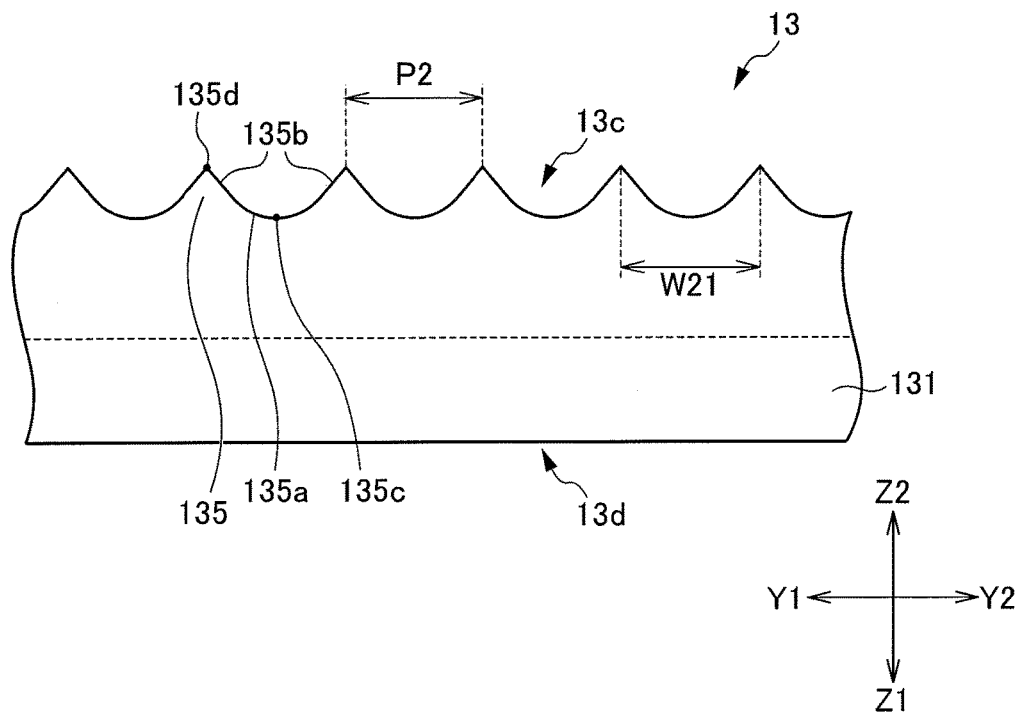
FIG. 2 is a diagram illustrating a shape of a light guide plate 13 according to the first embodiment.
Figure 2B:
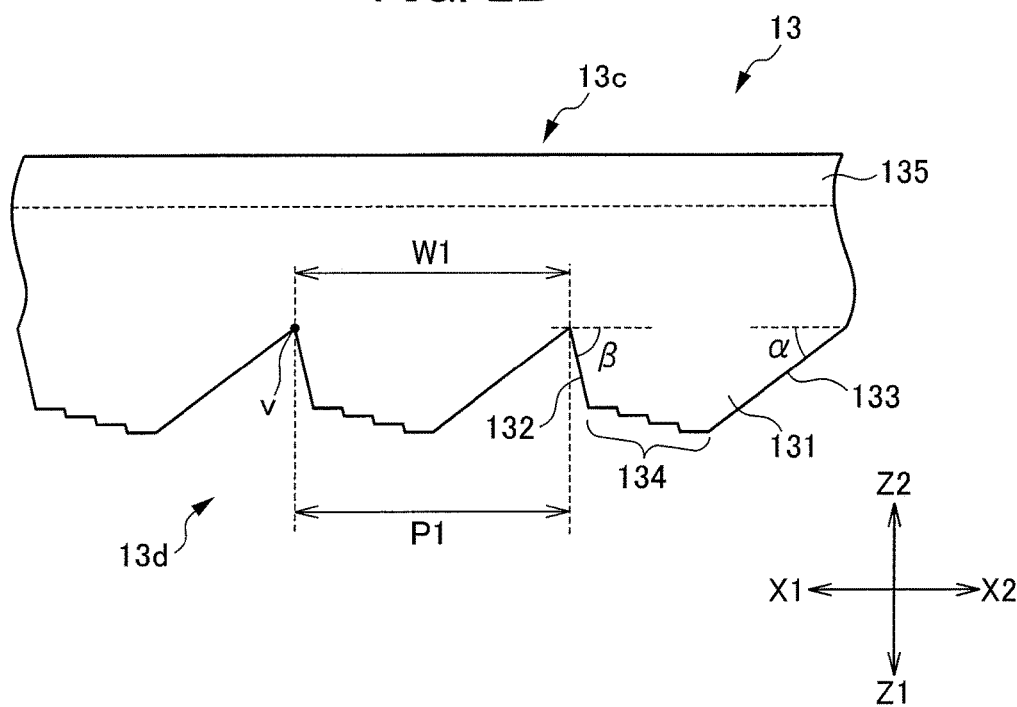
Figure 3:
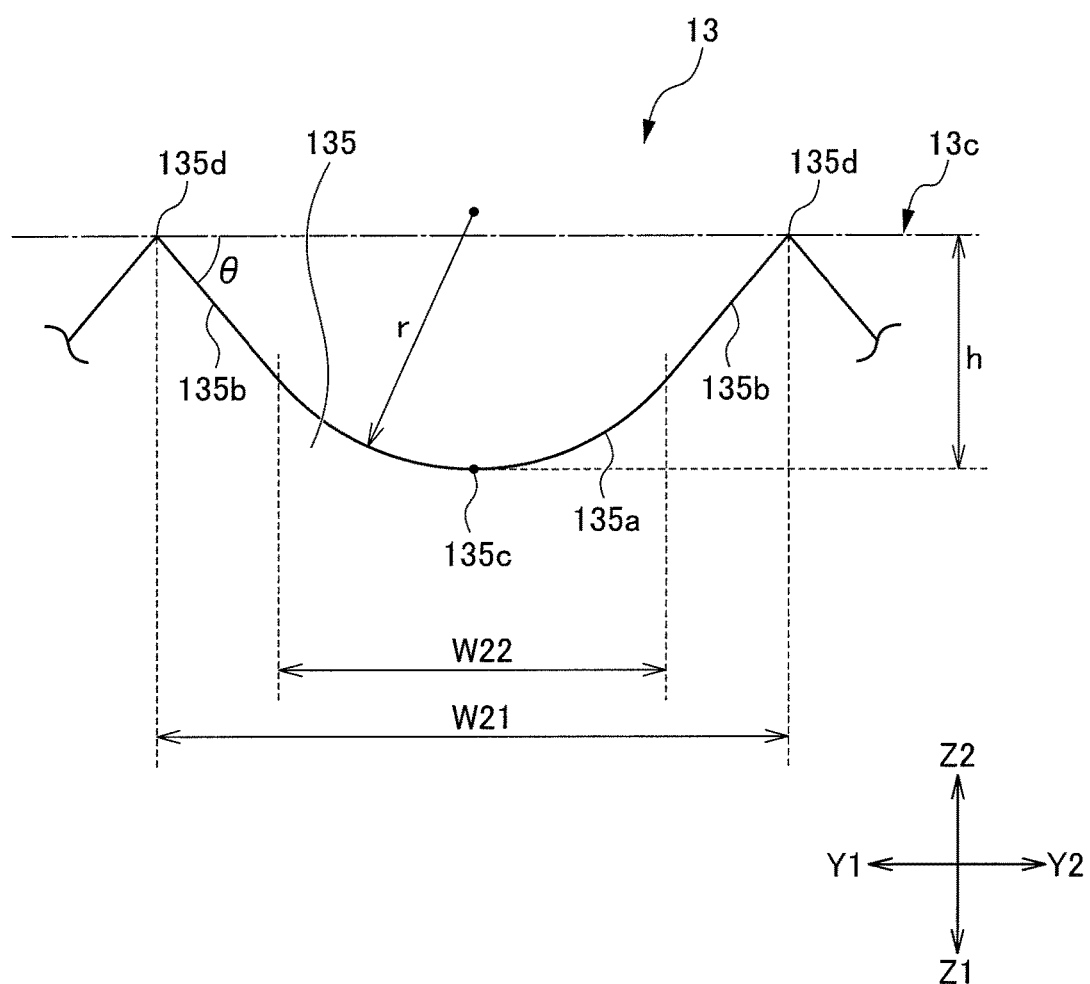
FIG. 3 is a diagram illustrating details of a light-emitting-side unit optical shape 135 according to the first embodiment.

FIG. 2 is a diagram illustrating a shape of the light guide plate 13 according to the embodiment. FIG. 2(a) is a diagram illustrating a light-emitting-side unit optical shape 135, and FIG. 2(b) is a diagram illustrating a back-surface-side unit optical shape 131. In FIG. 2(a), a portion of a cross section parallel to the YZ plane of the light guide plate 13 is illustrated enlarged, and in FIG. 2(b), a portion of a cross section parallel to the XZ plane of the light guide plate 13 is illustrated enlarged. FIG. 3 is a diagram illustrating details of a light-emitting-side unit optical shape 135 according to the embodiment. In FIG. 3, the portion of the cross section of the light guide plate 13 parallel to the YZ plane illustrated in FIG. 2(a) is illustrated enlarged further. FIG. 4 is a diagram illustrating a back-surface-side unit optical shape 131 according to the embodiment. In FIG. 4, a portion of a cross section of the light guide plate 13 parallel to the XZ plane illustrated in FIG. 2(b) is illustrated enlarged further. As illustrated in FIG. 2, in the light guide plate 13, a plurality of light-emitting-side unit optical shapes 135 are formed to be arranged on the light emitting surface 13c and a plurality of back-surface-side unit optical shapes 131 are formed to be arranged on the back surface 13d.

As illustrated in FIG. 1 and FIG. 2(a), the light-emitting-side unit optical shape 135 is formed in a groove shape, which is recessed from the light emitting surface side (LCD panel 11 side, Z2 side) and extends in the X direction (light guide direction), and a plurality of the light-emitting-side unit optical shapes are arranged in the Y direction adjacent to each other. As illustrated in FIG. 2(a) and FIG. 3, in the light-emitting-side unit optical shape 135, a bottom 135c of the groove shape is formed on a concave surface 135a which is concave toward the back surface 13d side, and flat inclined surfaces 135b which are inclined from an edge portion 135d of the groove shape toward the bottom 135c side are formed in two end portions of the concave surface 135a in the Y direction. The light-emitting-side unit optical shape 135 is formed to be symmetric with respect to a boundary line which passes through the bottom 135c and is parallel to the thickness direction (Z direction) in the cross section illustrated in FIG. 3.

An arrangement pitch of the light-emitting-side unit optical shapes 135 is P2, and a width of the light-emitting-side unit optical shape 135 in the arrangement direction (Y direction) is W21. In the embodiment, since a plurality of the light-emitting-side unit optical shapes 135 are arranged to be adjacent to each other, the arrangement pitch P2 and the width W21 are formed to be equal to each other (P2=W21). In addition, a maximum inclination angle between a surface tangential to the inclined surface 135b of the light-emitting-side unit optical shape 135 and the light emitting surface 13c (plate surface of the light guide plate 13 in the light emitting side, the surface parallel to the XY plane, the surface indicated by one-dot dashed line in FIG. 3) of the light guide plate 13 is θ. In addition, a distance (hereinafter, referred to as a depth of the light-emitting-side unit optical shape 135) from the light emitting surface 13c (plate surface of the light guide plate 13 in the light emitting side, the surface parallel to the XY plane, the surface indicated by one-dot dashed line in FIG. 3) of the light guide plate 13 to the bottom 135c of the light-emitting-side unit optical shape 135 is h. In addition, a width of the concave surface 135a formed in the light-emitting-side unit optical shape 135 in the arrangement direction (Y direction) is W22.

It is preferable that the arrangement pitch P2 is in a range of about 10 to about 100 μm. If the arrangement pitch P2 is smaller than this range, the light-emitting-side unit optical shape 135 is difficult to manufacture, and thus, the shape in accordance with the design cannot be achieved. In addition, if the arrangement pitch P2 is larger than this range, moire easily occurs to pixels of the LCD panel 11, or in the state used as the surface light source device 10 or the like, the pitch of the light-emitting-side unit optical shapes 135 is easily recognized. Therefore, it is preferable that the arrangement pitch P2 is set to the above range.

In addition the light-emitting-side unit optical shape 135 according to the embodiment is formed so that the maximum inclination angle θ between the surface tangential to the inclined surface 135b and the light emitting surface 13c satisfies 20°≤θ≤45°. In addition, the light-emitting-side unit optical shape is formed so that a radius of curvature r [μm] of the concave surface 135a of the light-emitting-side unit shape 135 satisfies r≥W21/(4×sin θ). In addition, the above-described radius of curvature r is a radius of the concave surface 135a obtained by three points of the bottom 135c, the point on the concave surface 135a which is separated by 5 μm from the bottom 135c in the Y1 direction, and the point on the concave surface 135a which is separated by 5 μm from the bottom in the Y2 direction on the cross section illustrated in FIG. 3. In the embodiment, since the concave surface 135a has a shape which is concave toward the back surface side, the center of the above-described radius of curvature is located closer to the Z2 side than the light emitting surface 13c of the light guide plate 13.

Herein, in the related art, light-emitting-side unit optical shapes, of which a cross-sectional shape is formed on the YZ plane, for example, in a convex shape such as a pentagonal shape, are formed on a light emitting surface of a light guide plate (refer to FIG. 16) so that in-plane non-uniformity in brightness in the vicinity of a light incident surface of the light emitting surface of the light guide plate is not conspicuous. However, in the case when such unit optical shapes are formed on the light emitting surface of the light guide plate, directionality of the light inside the light guide plate is easily maintained. Therefore, in the case when color irregularity or luminance irregularity exists in each LED used as a light source unit, in some cases streaky irregularity may be observed in the central portion of the light emitting surface, or luminance irregularity (hot spot) may be observed in the vicinity of the light incident surface.

On the contrary, as described above, the light guide plate 13 according to the embodiment is formed so that the light-emitting-side unit optical shapes 135 configured with the concave surface 135a and the inclined surfaces 135b are provided and the radius of curvature r and the maximum inclination angle θ of the light-emitting-side unit optical shape 135 satisfy the above-described respective numerical ranges. Therefore, in the light guide plate 13 according to the embodiment, the light guided inside the light guide plate can be widened more in the Y direction to be emitted, and thus, even though color irregularity or luminance irregularity exists in the LED used for the light source unit 12, it is possible to prevent streaky irregularity from occurring in the central portion of the light emitting surface and to prevent a hot spot from occurring in the vicinity of the light incident surface. In addition, by configuring the light-emitting-side unit optical shape 135 according to the embodiment in this form, it is possible to easily remove extraneous substances such as dust adhered to the light emitting surface of the light guide plate 13 using a flow of air or the like.

In addition, in the light-emitting-side unit optical shape 135, it is preferable that a ratio R (=W22/W21) of a width W22 of the concave surface 135a to a width W21 of the light-emitting-side unit optical shape 135 in the arrangement direction (Y direction) is 50%≤R≤80%. The ratio R satisfies the above-described numerical range so that it is possible to more effectively achieve the above-described effect of preventing the streaky irregularity and hot spot. If the ratio R is less than 50%, since the width W22 of the concave surface 135a is too small in comparison with the width W21 of the light-emitting-side unit optical shape 135, the light cannot be sufficiently widened in the Y direction, so that the streaky irregularity occurs, which is not preferable. However, in the case when the irregularity in color of the light emitted from each point light source is small, in some cases, even though the ratio R is less than 50%, the streaky irregularity may be prevented from occurring. In addition, in the case when the ratio R is more than 80%, the width W22 of the concave surface 135a with respect to the width W21 of the light-emitting-side unit optical shape 135 becomes too large, although the streaky irregularity is prevented from occurring, the hot spot occurs, which is not preferable. However, in the case when a bezel (frame) (not shown) provided to the transmissive display device 1 overlaps the light emitting surface 13c side on the light incident surface 13a of the light guide plate 13, and thus, the width of the non-display portion is sufficiently large, in some cases, even though the ratio R is more than 80%, the hot spot may be prevented from being observed.

As illustrated in FIGS. 1, 2(b), and 4, the back-surface-side unit optical shape 131 has a prism shape which is convex toward the back surface side (Z1 side), and a plurality of the back-surface-side unit optical shapes are arranged in the X direction, which is the light guide direction, while the longitudinal direction (ridge line direction) is set to the Y direction. As illustrated in FIG. 2(b), the back-surface-side unit optical shape 131 is parallel to the arrangement direction thereof, and a cross sectional shape thereof on the cross section (XZ plane) in the direction perpendicular to the plate surface of the light guide plate 13 is a substantially trapezoidal shape. The back-surface-side unit optical shape 131 is configured to include a first inclined surface portion 132, which is located in the light incident surface side (X1 side), a second inclined surface portion 133, which is located in the counter surface side (X2 side), to totally reflect at least a portion of the incident light, and a top surface portion 134, which is located between the first inclined surface portion 132 and the second inclined surface portion 133. An arrangement pitch of the back-surface-side unit optical shapes 131 is P1, and the arrangement pitch P1 is set to be equal to the width W1 of the back-surface-side unit optical shape 131 in the arrangement direction (P1=W1). In the embodiment, the arrangement pitch P1 is constant in the arrangement direction.

The first inclined surface portion 132 has an angle β with respect to a plane surface (surface parallel to the light emitting surface 13c, surface parallel to the XY plane) of the light guide plate 13. In addition, the second inclined surface portion 133 has an angle α with respect to the plane surface (surface parallel to the light emitting surface 13c, surface parallel to the XY plane) of the light guide plate 13. In this case, with respect to the angles α and β, α<β. The first inclined surface portion 132 located on the light incident surface 13a side in the back-surface-side unit optical shape 131 is inclined so that the counter surface side (top surface portion side) end portion is closer to the back surface than the light incident surface side end portion. Therefore, it is difficult for the light guided from the light incident surface 13a side toward the counter surface 13b side (from the X1 side toward the X2 side) to be incident on the first inclined surface portion 132.

The second inclined surface portion 133 allows a portion of the light guided inside the light guide plate 13 to be incident on the second inclined surface portion and totally reflects at least a portion of the incident light. Due to the total reflection in the second inclined surface portion 133, the propagation direction of the light is changed to a direction when the incident angle with respect to the light emitting surface 13c (surface parallel to the XY plane) is to be decreased. Therefore, from the point of view of improving both of uniformity of brightness in the light guide direction and light extraction efficiency, it is preferable that the angle α satisfies 1°<α≤5°. If α≤1°, when the light propagating in the light guide direction (X direction) is totally reflected by the second inclined surface portion 133, a change in angle with respect to the light emitting surface 13c (surface parallel to the XY plane) before and after the total reflection is too small, so that a sufficient amount of light cannot be extracted, and thus, the light extraction efficiency is decreased. In addition, if α>5°, when the light propagating in the light guide direction (X direction) is totally reflected by the second inclined surface portion 133, a change in angle with respect to the light emitting surface 13c (surface parallel to the XY plane) before and after the total reflection is too large, so that luminance irregularity or brightness in an area far away from the light incident surface 13a is decreased. In addition, since irregularity of the light emitting direction from the light guide plate 13 is increased, the deflection function in the prism sheet 15 described later becomes insufficient, so that the property of convergence is decreased and front luminance is decreased. Therefore, it is preferable that the angle α satisfies 1°<α≤5°.

The top surface portion 134 has a plurality of surfaces having different heights h toward the back surface side (Z1 side). Herein, the height h with respect to the back surface side (Z1 side) is a distance from a surface (surface parallel to the light emitting surface 13c) which passes through a point v located at a valley bottom between the back-surface-side unit optical shapes 131 and is parallel to the plate surface of the light guide plate 13 toward the back surface side (Z1 side). As an example, the top surface portion 134 illustrated in FIG. 4 has surfaces 134a, 134b, 134c, and 134d. The surfaces 134a to 134d are surfaces which are parallel to the light emitting surface 13c (plate surface of the light guide plate 13) and are arranged in the arrangement direction (X direction) of the back-surface-side unit optical shapes 131, while the longitudinal direction (Y direction) of the back-surface-side unit optical shape 131 is set to the longitudinal direction thereof. In addition, the surfaces 134a to 134d have different heights h toward the back surface side.

The height h with respect to the back surface side of the surface 134a located at the side (light incident surface side, X1 side) closest to the first inclined surface portion 132 among the surfaces 134a to 134d is the smallest. As it goes toward the second inclined surface portion 133 side (counter surface side, X2 side), the height h with respect to the back surface side is gradually increased. The height h with respect to the back surface side of the surface 134d located at the side closest to the second inclined surface portion 133 is the largest. The top surface portion 134 has such surfaces 134a to 134d so that the top surface portion has a step shape along the arrangement direction. The difference in height h with respect to the back surface side between the surfaces may be constant or may be different. In addition, inclined surfaces 134e are formed between the surfaces 134a to 134d. The inclined surface 134e is an inclined surface that has angle β with respect to the plate surface (plane parallel to the XY plane) of the light guide plate 13 and is parallel to the first inclined surface portion 132. In this manner, the top surface portion 134 is formed in a step shape configured with a plurality of surfaces having different heights h toward the back surface side (Z1 side), so that it is possible to reduce the contact area between the reflection sheet 14 arranged on the back surface side of the light guide plate 13 and the back surface 13d of the light guide plate 13, and it is possible to prevent optical contact between the light guide plate 13 and the reflection sheet 14. In addition, in the embodiment, the example where the widths of the surfaces 134a to 134d in the arrangement direction are equal is described. However, the widths in the arrangement direction may not be equal to each other.

Figure 5A:
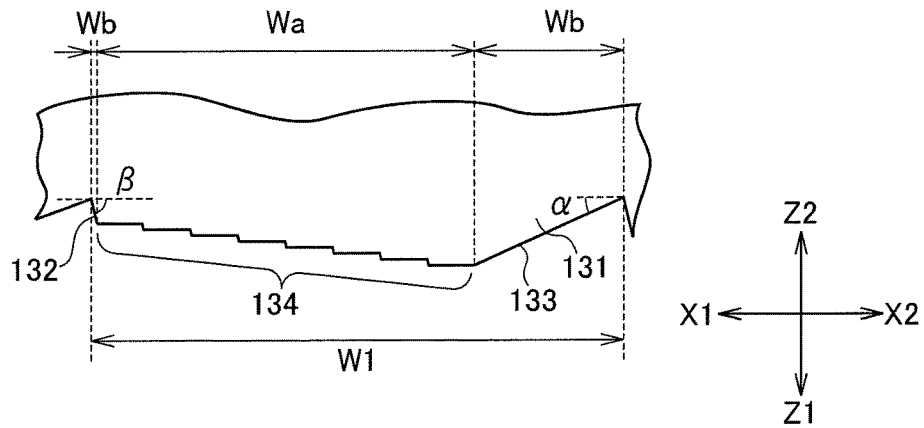
FIG. 5 is a diagram illustrating shapes of components of the back-surface-side unit optical shape 131 in an arrangement direction according to the first embodiment.
Figure 5B:
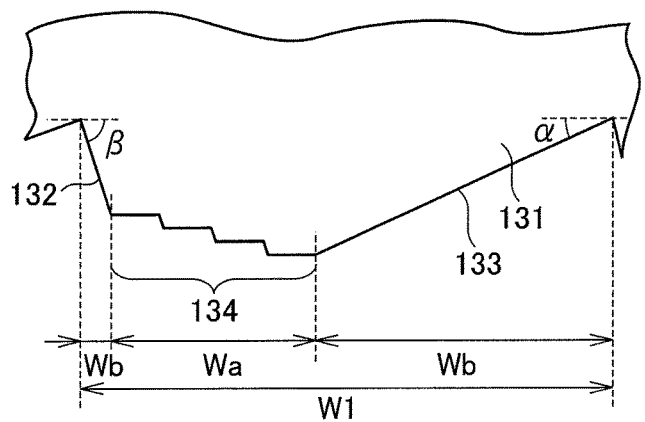
Figure 5C:
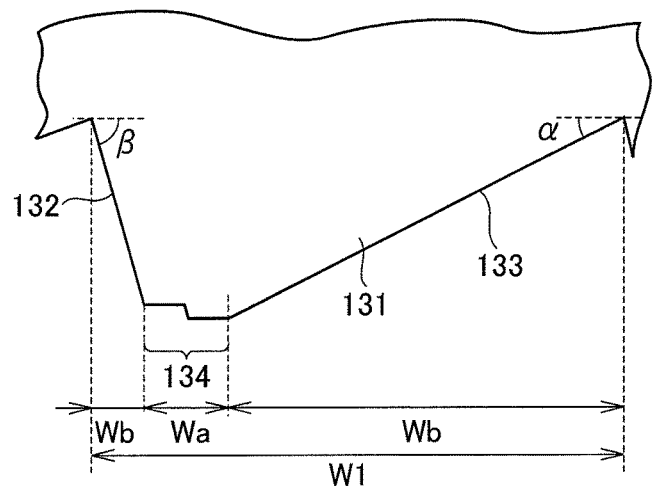

FIG. 5 is a diagram illustrating shapes of components of the back-surface-side unit optical shape 131 in an arrangement direction according to the embodiment. FIG. 5(a) illustrates a vicinity of the light incident surface 13a, FIG. 5(b) illustrates a central portion in the arrangement direction, and FIG. 5(c) illustrates a vicinity of the counter surface 13b. In the arrangement direction of the back-surface-side unit optical shape 131, a width of the back-surface-side unit optical shape 131 is denoted by W1, a width of the top surface portion 134 is denoted by Wa, and a width of the first inclined surface portion 132 and a width of the second inclined surface portion 133 are denoted by Wb. In the back-surface-side unit optical shape 131, the arrangement pitch P1, the width W1, and the angles α and β are constant in the arrangement direction. However, the ratio Wb/W1 of the widths Wb of the first inclined surface portion 132 and the second inclined surface portion 133 to the width W1 of the back-surface-side unit optical shape 131 increases with distance from the light incident surface 13a along the arrangement direction. In addition, the ratio Wa/W1 of the width Wa of the top surface portion 134 to the width W1 of the back-surface-side unit optical shape 131 decreases with distance from the light incident surface 13a along the arrangement direction.

Namely, as illustrated in FIG. 5(a), in the vicinity of the light incident surface 13a (light source unit side), the ratio Wa/W1 of the width Wa of the top surface portion 134 to the width W1 of the back-surface-side unit optical shape 131 is large, and the ratio Wb/W1 of the widths Wb of the first inclined surface portion 132 and the second inclined surface portion 133 to the width W1 of the back-surface-side unit optical shape 131 is small. As illustrated in FIG. 5(b), the ratio Wa/W1 gradually decreases, and the ratio Wb/W1 gradually increases toward the counter surface side (X2 side). In addition, as illustrated in FIG. 5(c), in the vicinity of the counter surface 13b, the ratio Wb/W1 is large, and the ratio Wa/W1 is small. In this manner, toward the counter surface side, the ratio of the two inclined surface portions (particularly, the second inclined surface portion 133) is set to be large, so that it is possible for light to be efficiently emitted, and it is possible to improve uniformity of brightness in the light guide direction.

In the embodiment, the ratio Wb/W1 is about 20/100 at the side (X1 side) closest to the light incident surface, and the ratio is about 80/100 at the side (X2 side) closest to the counter surface side. However, the invention is not limited thereto, but the ratio Wb/W1 may be appropriately set according to desired optical performance or the like, and the ratio may be appropriately set in a range where the ratio is about 10/100 at the side closest to the light incident surface and is about 90/100 at the side closest to the counter surface side.

In the embodiment, as described above, the arrangement pitch P1 (width W1), and the angles α and β are set to be constant, and as illustrated in FIG. 5, the number of surfaces constituting the top surface portion 134 drops toward the counter surface side (X2 side), so that the ratio of the width Wb of the two inclined surface portions (particularly, the second inclined surface portion 133) to the width W1 of the back-surface-side unit optical shape 131 increases. However, the invention is not limited thereto, but the number of surfaces constituting the top surface portion 134 is set to be constant and widths of the surfaces are adjusted, so that the width Wa of the top surface portion 134 may be formed. In addition, since, on the side closest to the counter surface side and in the vicinity thereof, the width Wa of the top surface portion 134 is sufficiently small and influence by optical contact between the reflection sheet 14 and the top surface portion 134 is decreased, in the back-surface-side unit optical shape 131 located on the side closest to the counter surface side or in the vicinity thereof, the top surface portion 134 may be formed with one surface.

In the light guide plate 13 according to the embodiment, the surface having the largest height h with respect to the back surface side becomes the contact portion with respect to the reflection sheet 14. For example, in FIG. 4, a surface 134d becomes the contact portion. In this case, the width of the contact portion (surface 134d having the largest height with respect to the back surface side) with respect to the arrangement pitch P1 of the back-surface-side unit optical shape 131 is denoted by Wc, from the point of view of preventing optical contact between the reflection sheet 14 and the light guide plate 13, it is preferable that the ratio Wc/P1 satisfies $0.09 \leq Wc/P1 \leq 0.40$.

A ratio Wc/P1 with a small value is effective in preventing optical contact. However, if Wc/P1<0.09, the value of the contact portion (surface 134d) becomes small, so that there are problems in that the contact portion of the back-surface-side unit optical shape 131 is easily destroyed, the light guide plate 13 having such a contact portion is difficult to manufacture, and production cost is increased. In addition, there is a possibility that the reflection sheet 14 is destroyed. In addition, if Wc/P1>0.40, the value of the contact portion becomes large, and thus, the contact area between the light guide plate 13 and the reflection sheet 14 becomes large, so there is a problem in that optical contact easily occurs. Therefore, it is preferable that the ratio Wc/P1 satisfies $0.09 \leq Wc/P1 \leq 0.40$.

In addition, as described above, in the embodiment, the width Wa of the top surface portion 134 with respect to the width W1 (arrangement pitch P1) of the back-surface-side unit optical shape 131 decreases with distance from the light source unit 12 along the light guide direction. On the other hand, the ratio Wc/P1 is constant or substantially constant along the light guide direction. The invention is not limited thereto, but the ratio Wc/P1 may be changed along the light guide direction.

In addition, it is preferable that the arrangement pitch P1 is set to be from about 50 to about 300 μm. If the arrangement pitch P1 is smaller than this range, the back-surface-side unit optical shape 131 is difficult to manufacture, so that the shape in accordance with design cannot be achieved. In addition, if the arrangement pitch P1 is larger than this range, the area of the surface 134d that becomes the contact portion increases in proportion to the arrangement pitch P1, so that optical contact easily occurs. In addition, if the arrangement pitch P1 is larger than this range, moire easily occurs, or in the state used as the surface light source device 10 or the like, the pitch of the back-surface-side unit optical shapes 131 is easily recognized. Therefore, it is preferable that the arrangement pitch P1 is set to be in the above range.

Figure 7:
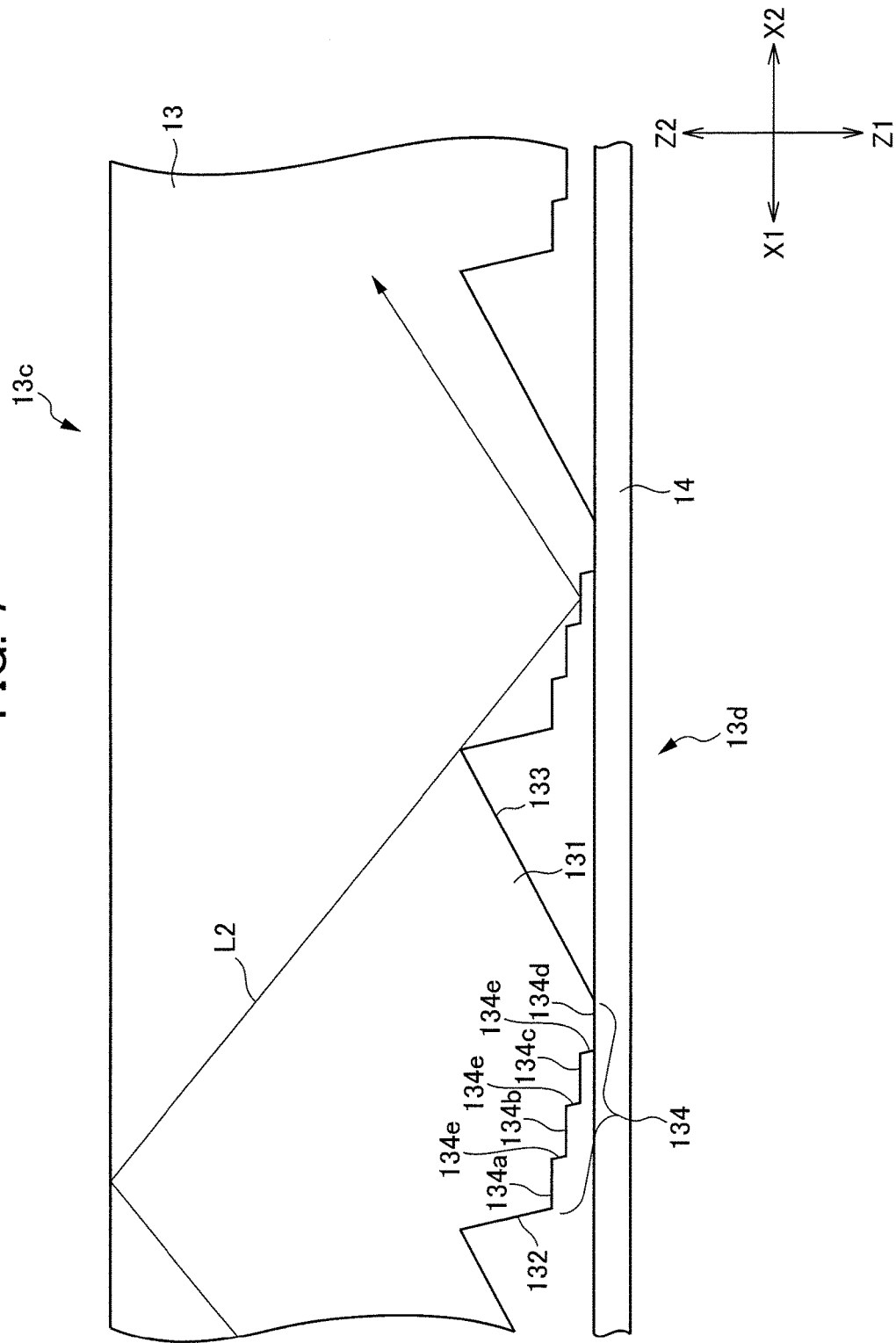
FIG. 7 is a diagram illustrating an example of behavior of light guiding of the light guide plate 13 according to the first embodiment.

FIG. 7 is a diagram illustrating an example of behavior of light guiding of the light guide plate 13 according to the embodiment. The top surface portion 134 of the light guide plate 13 has a step shape where the height h with respect to the back surface side gradually increases with distance from the surface 134a located at the light incident surface side toward the counter surface side, and the inclined surfaces 134e located between the surfaces have an angle β with respect to the surface parallel to the light emitting surface 13c. Therefore, the light guided from the light incident surface side is difficult to be incident, and even though the light is incident, the influence thereof is small. Therefore, in terms of design, the top surface portion 134 according to the embodiment is substantially the same as the top surface portion configured with one surface parallel to the light emitting surface 13c. Therefore, according to the embodiment, as illustrated in FIG. 7, the light L2 incident on the top surface portion 134 can be totally reflected, and thus, light propagating in a direction deviating from optical design hardly occurs. Accordingly, a good light guide plate 13, a good surface light source device 10, and a good transmissive display device 1 having high in-plane uniformity in brightness can be achieved.

The light guide plate 13 according to the embodiment is formed by manufacturing a mold for shaping the back-surface-side unit optical shape 131 and a mold for shaping the light-emitting-side unit optical shape 135 by using a bite or the like and by performing extrusion molding, injection molding, or the like by using the molds. The thermoplastic resin used is not particularly limited if the resin has high optical transparency. For example, an acrylic resin, a COP (cyclo olefin polymer) resin, a PC resin, and the like may be exemplified. In addition, the invention is not limited thereto, but the light guide plate 13 may be formed by integrally forming the back-surface-side unit optical shape 131 and the light-emitting-side unit optical shape 135 according to an ultraviolet molding method on two surfaces of a sheet-shaped member formed by extrusion molding or the like.

Referring to FIG. 1, the reflection sheet 14 is a sheet-shaped member capable of reflecting light and is arranged to be closer to the back surface side (Z1 side) than the light guide plate 13. The reflection sheet 14 has a function of reflecting light directed from the light guide plate 13 toward the Z1 side to direct inward the light guide plate 13. From the point of view of increasing light utilization efficiency or the like, it is preferable that the reflection sheet 14 mainly has a specular reflection property (positive reflection property). As the reflection sheet 14, for example, a sheet-shaped member where at least a reflecting surface (surface in the light guide plate 13 side) is formed with a material having a high reflectivity such as a metal, a sheet-shaped member including a thin film (for example, a metal thin film) formed with a material having a high reflectivity as a surface layer, or the like may be used. In addition, the invention is not limited thereto, but the reflection sheet 14 may be, for example, a sheet-shaped member that mainly has diffusive reflectivity and is made of a white resin having high reflectivity, or the like.

Figure 6:
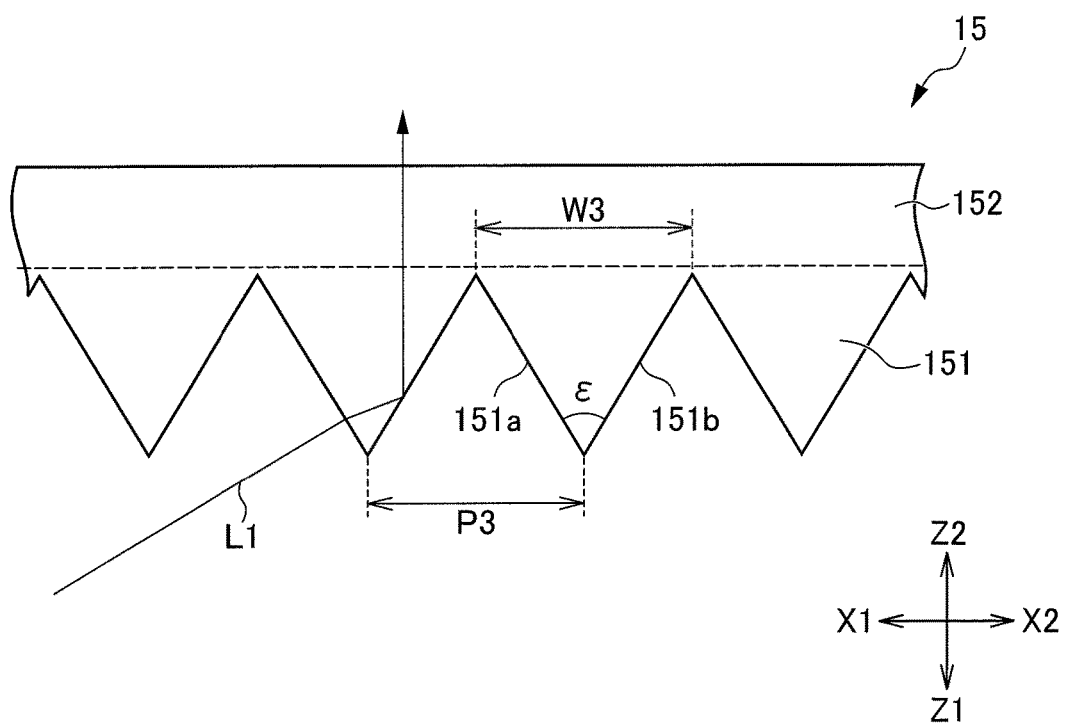
FIG. 6 is a diagram illustrating a prism sheet 15 according to the first embodiment.

FIG. 6 is a diagram illustrating the prism sheet 15 according to the embodiment. In FIG. 6, a portion of a cross section of the prism sheet 15 parallel to the XZ plane is illustrated enlarged. The prism sheet 15 is arranged to be closer to the LCD panel 11 side (Z2 side) than the light guide plate 13 (refer to FIG. 1). The prism sheet 15 is a deflection optical sheet having a function of deflecting (condensing) a propagation direction of light emitted from the light emitting surface 13c of the light guide plate 13 to the front direction (Z direction) or a direction where the angle with respect to the Z direction is decreased. The prism sheet 15 is configured to include a prism base layer 152 and a plurality of unit prisms 151 which are formed to be arranged at the light guide plate 13 side (Z1 side) of the prism base layer 152.

The prism base layer 152 is a portion that becomes a base of the prism sheet 15. A sheet-shaped member made of a resin having optical transparency is used as the prism base layer 152. The unit prism 151 has a triangular prism shape which is convex toward the light guide plate 13 side (Z1 side), and a plurality of the unit prisms are arranged in the X direction on the surface of the back surface side (Z1 side) of the prism base layer 152 while the longitudinal direction (ridge line direction) thereof is set to the Y direction. Namely, the arrangement direction of the unit prisms 151 is parallel to the arrangement direction of the back-surface-side unit optical shapes 131 of the light guide plate 13 as viewed from the normal direction (Z direction) of the display surface of the transmissive display device 1 and is perpendicular to the arrangement direction of the light-emitting-side unit optical shapes 135.

The unit prism 151 according to the embodiment illustrates an example where the cross-sectional shape in the cross section (XZ plane) parallel to the arrangement direction (X direction) and the direction (Z direction) perpendicular to the sheet surface is in the shape of an isosceles triangle having an apex angle $\epsilon$. However, the invention is not limited thereto, but the cross-sectional shape of the unit prism 151 may be a scalene triangular shape. In addition, the unit prism 151 may have a shape where at least one surface has a folded planar shape configured with a plurality of surfaces, it may have a shape with a combination of curved and planar surfaces, or may have a shape where the cross-sectional shape is non-symmetric in the arrangement direction. The unit prism 151 is formed in a shape where the arrangement pitch is P3, the width in the arrangement direction is W3, and the arrangement pitch in the arrangement direction and the lens width in the arrangement direction are equal to each other (P3=W3). The prism sheet 15 allows light L1 emitted from the light guide plate 13 and incident on the one surface (for example, surface 151a) to be totally reflected by the other surface (for example, surface 151b), so that the propagation direction of the light is deflected (condensed) to the front direction (Z direction) or a direction where the angle with respect to the front direction is decreased.

The prism sheet 15 is manufactured by forming the unit prisms 151 using an ionized radiation curable resin, such as an ultraviolet curable resin, on one surface of a sheet-shaped prism base layer 152 made of, for example, a PET (polyethylene terephthalate) resin or a PC (polycarbonate) resin. In addition, the invention is not limited thereto, but for example, the prism sheet 15 may be formed by performing extrusion molding on a thermoplastic resin such as a PC resin, an MBS (methyl methacrylate-butadiene-styrene copolymer) resin, an MS (methyl methacrylate-styrene copolymer) resin, a PET resin, or a PS (polystyrene).

Returning to FIG. 1, the light diffusion sheet 16 is a sheet-shaped member having a light diffusion function. The light diffusion sheet 16 is provided on the LCD panel 11 side (Z2 side) of the prism sheet 15. By providing the light diffusion sheet 16, it is possible to achieve an effect of appropriately widening a viewing angle or reducing moire or the like generated by pixels (not shown) of the LCD panel 11, the unit prisms 151, and the like. Various general-purpose sheet-shaped members having light diffusion property may be appropriately selected to be used as the light diffusion sheet 16 in accordance with desired optical performance of the surface light source device 10 and the display device 1 or optical characteristics of the light guide plate 13.

A sheet-shaped member made of a resin containing a diffusion material, a member formed by coating a binder containing a diffusion material on at least one surface of a sheet-shaped member made of a resin as a base, a microlens sheet where a microlens array is formed on one surface or the like of a sheet-shaped member made of a resin as a base or the like may be used as the light diffusion sheet 16.

In addition, a fine uneven shape may be formed on the surface on the light emitting side (Z2 side) of the prism base layer 152 of the prism sheet 15 described above for the purpose of preventing optical contact with respect to the light diffusion sheet 16 or applying a light diffusion function. A mat layer or the like formed by coating a binder containing a bead-shaped filler is very appropriately used as the uneven shape, but is not limited thereto.

In addition, the invention is not limited to the light diffusion sheet 16, a polarization selective reflection sheet having a function of transmitting light in a specific polarization state and reflecting light in other polarization states may be arranged on the side (Z2 side) closer to the LCD panel 11 than the prism sheet 15. In addition, in case of using the polarization selective reflection sheet, from the point of view of improving luminance or light utilization efficiency, it is preferable that a transmission axis of the polarization selective reflection sheet is arranged to be parallel to a transmission axis of a polarizing plate (not shown) located on the light incident side (Z1 side) of the LCD panel 11. For example, a DBEF series (produced by Sumitomo 3M Co., Ltd.) may be used as the polarization selective reflection sheet. In addition, the invention is not limited to the light diffusion sheet 16, but various optical sheets, such as a lenticular lens sheet, may be arranged. In addition, the above-described polarization selective reflection sheet or various optical sheets may be arranged on the LCD panel 11 side of the light diffusion sheet 16.

(Evaluation for Light-Emitting-Side Unit Optical Shape by Simulation)

Figure 8A:
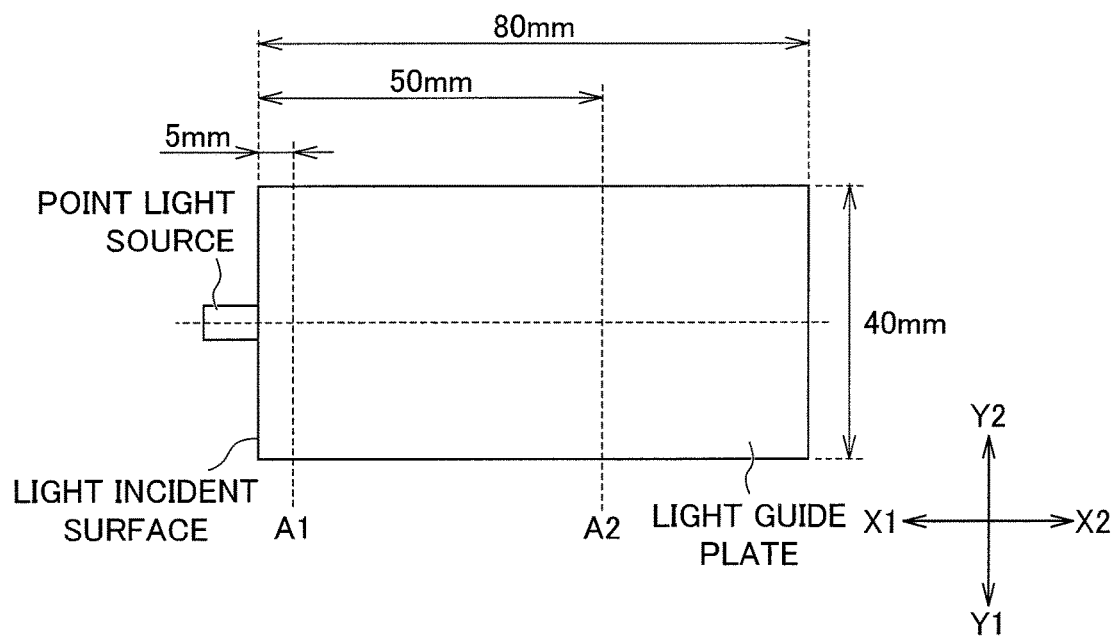
FIG. 8 is a diagram illustrating models of light guide plates of each Example and each Comparative Example used for simulation.
Figure 8B:
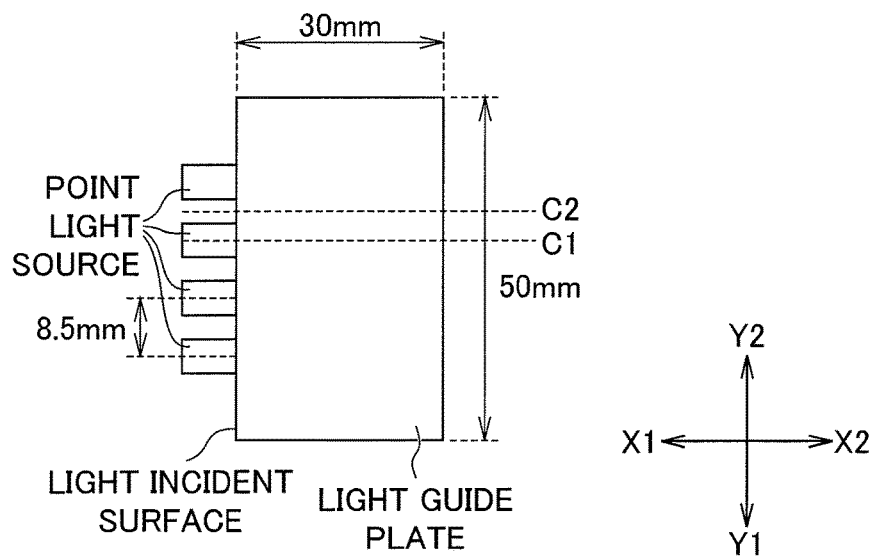

Next, plural types of light-emitting-side unit optical shapes provided on the light emitting surface of the light guide plate are set, and the occurrence of streaky irregularity or hot spot caused by color irregularity or luminance irregularity of each LED of the light source unit in the light emitting surface of the light guide plate as viewed from the Z2 side is evaluated by performing simulation. FIG. 8 is a diagram illustrating models of light guide plates of each Example and each Comparative Example used for the simulation. FIG. 8(a) is a diagram illustrating a model of a light guide plate used for evaluation of streaky irregularity, and FIG. 8(b) is a diagram illustrating a model of a light guide plate used for evaluation of hot spot.

Light Tools version 7 produced by Cybernet System is used for the evaluation in the simulation. With respect to the light guide plates in Examples 1 to 8 and Comparative Examples 1 to 5 used for the simulation, similarly to the above-described embodiment, a light guide direction of light is defined as an X direction (X1-X2 direction), the direction perpendicular to the light guide direction is defined as a Y direction (Y1-Y2 direction), and a thickness direction is defined as a Z direction (Z1-Z2 direction) (refer to FIG. 1). In addition, a light incident surface is formed on a surface of the light guide plate on the X1 side, a light emitting surface is formed on a surface on the Z2 side, and the light-emitting-side unit optical shapes are provided on the light emitting surface.

A simulation model of the light guide plates in Examples 1 to 8 and Comparative Examples 1 to 5 used for streaky irregularity evaluation is formed so that, as illustrated in FIG. 8(a), a length in the X direction is 80 mm, a length in the Y direction is 40 mm, and a thickness is 0.7 mm. On the light incident surface of the light guide plate, one LED as a point light source is arranged at a central portion of the light incident surface in the Y direction. A simulation model of the light guide plates in Examples 1 to 8 and Comparative Examples 1 to 5 used for hot spot evaluation is formed so that, as illustrated in FIG. 8(b), a length in the X direction is 30 mm, a length in the Y direction is 50 mm, and a thickness is 0.7 mm. In addition, a plurality of LEDs as point light sources are arranged on the light incident surface of the light guide plate at equal intervals (interval of 8.5 mm) in the Y direction.

In the light-emitting-side unit optical shapes of the light guide plates in Examples 1 to 8 and Comparative Examples 1 to 5, the arrangement pitch P2 thereof is P2=36 μm, and the width W21 is W21=36 μm. The light-emitting-side unit optical shapes provided on the light guide plates in Examples 1 to 8 are formed in a shape where, as illustrated in FIG. 3, the light-emitting-side unit optical shape is configured with the concave surface 135a and the inclined surface 135b and the radius of curvature r, the maximum inclination angle θ, and the ratio R satisfy the above-described respective numerical ranges (r≥W21/(4×sin θ), 20°≤θ≤45°, and 50%≤R≤80%).

Figure 16:
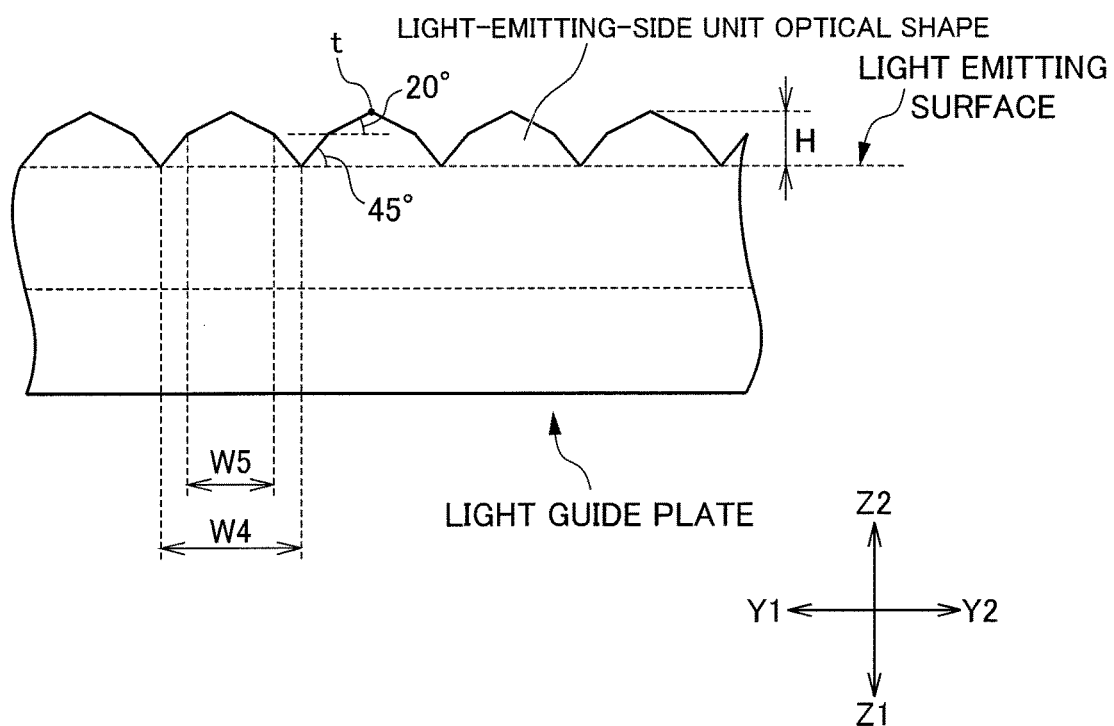
FIG. 16 is a diagram illustrating a light-emitting-side unit optical shape of light guide plates in Comparative Examples 4 and 5.

The light-emitting-side unit optical shapes in Comparative Examples 1 to 3 have the same shapes as those of the light-emitting-side unit optical shapes of the above-described Examples 1 to 8, but the light-emitting-side unit optical shapes are formed in a shape where either the radius of curvature r or the maximum inclination angle θ does not satisfy the above-described numerical range. FIG. 16 is a diagram illustrating the light-emitting-side unit optical shape of the light guide plates in Comparative Examples 4 and 5. As illustrated in FIG. 16, the light-emitting-side unit optical shape in Comparative Examples 4 and 5 is formed so that the light-emitting-side unit optical shape is convex toward the Z2 side from the light emitting surface and the cross-sectional shape thereof on the YZ plane is a pentagonal shape. The light-emitting-side unit optical shape in Comparative Examples 4 and 5 is formed to be symmetrical with respect to a boundary line which passes through the vertex t and is parallel to the thickness direction (Z direction) in the cross section illustrated in FIG. 16, and two types of inclined surfaces having different inclined angles are formed. In the light-emitting-side unit optical shape of the Comparative Examples 4 and 5, the inclined surface at the Z1 side thereof is inclined at 45° with respect to the light emitting surface, and the inclined surface at the Z2 side is inclined at 20° with respect to the light emitting surface. The light-emitting-side unit optical shape in Comparative Example 4 is formed so that the ratio (W5/W4) of the width W5 of the inclined surface of the Z2 side interposing the vertex t to the width W4 in the arrangement direction (Y direction) is 60%. The light-emitting-side unit optical shape in Comparative Example 5 is formed so that the ratio (W5/W4) is 80%.

Figure 9A:
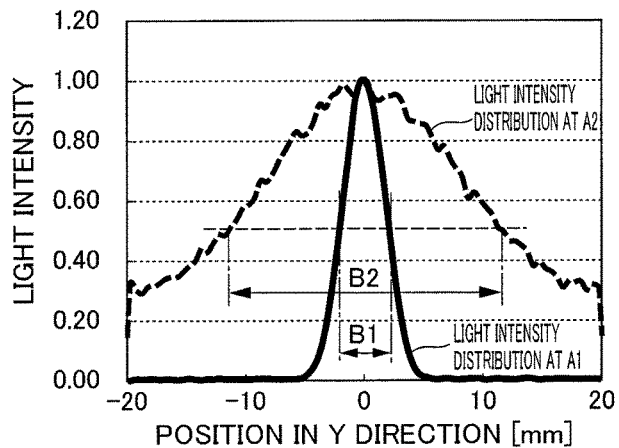
FIG. 9 is a diagram illustrating results of evaluation of streaky irregularity by simulation of light guide plates in Example 2, Comparative Example 4, and Comparative Example 5.
Figure 9B:
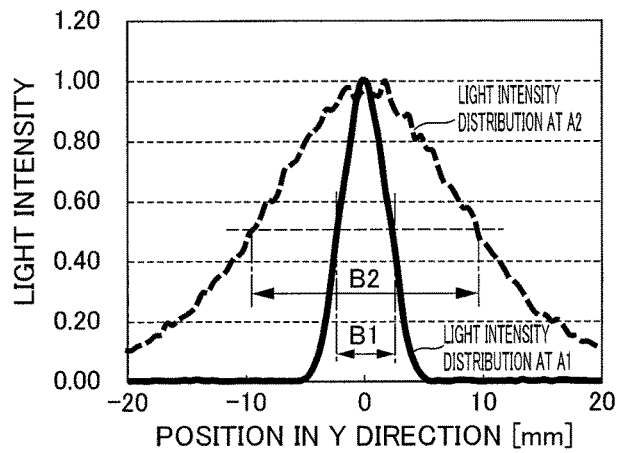
Figure 9C:
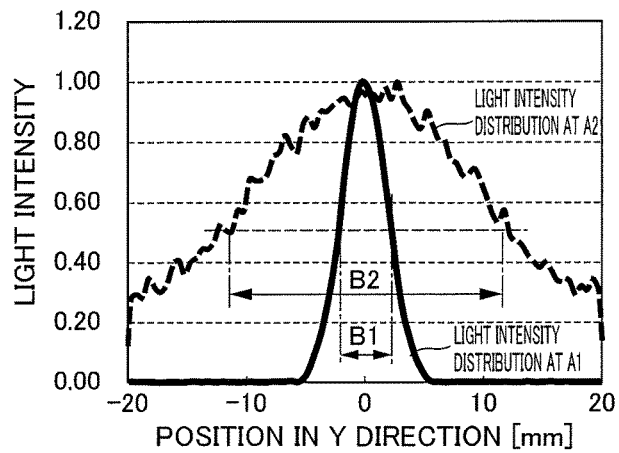

A summary of the results of the simulation evaluation is listed in the following Table 1. FIG. 9 is a diagram illustrating the results of evaluation of streaky irregularity by simulation of the light guide plates in Example 2, Comparative Example 4, and Comparative Example 5. FIG. 9(a) is a diagram illustrating light intensity distribution of the light guide plate in Example 2, FIG. 9(b) is a diagram illustrating light intensity distribution of the light guide plate in Comparative Example 4, and FIG. 9(c) is a diagram illustrating light intensity distribution of the light guide plate in Comparative Example 5. In each figure of FIG. 9, the vertical axis denotes normalized light intensity, and the horizontal axis denotes a position of the light guide plate in the Y direction.

In the evaluation of streaky irregularity, first, the simulation model of the above-described dimensions (X×Y: 80 mm×40 mm) is divided into 10000 points, and light intensity is calculated at each point. Next, as illustrated in FIGS. 8(a) and 9, light intensity distribution at a position A1, which is on a line parallel to the Y direction and is separated by 5 mm on the X2 side from the arrangement position of the light source unit, and Y-directional light intensity distribution at a position A2, which is on a line parallel to the Y direction and is separated by 50 mm on the X2 side from the arrangement position of the light source unit, are obtained. The light intensity distribution of each position (A1, A2) is normalized by division by the maximum value, and a Y-directional width (B1, B2) where the light intensity is half (0.5) of a maximum value (1.0) is obtained. Next, (width B2 at position A2)/(width B1 at position A1) is obtained, and if B2/B1≥5.0, it is determined the light is sufficiently widened in the Y direction so as to sufficiently suppress the streaky irregularity, and the evaluation of streaky irregularity is set as "⊙". In addition, if 4.5≤B2/B1<5.0, although slight streaky irregularity is observed, it is determined that the product is in a sufficiently usable range, and the evaluation of streaky irregularity is set as "○". On the other hand, if B2/B1<4.5, the light is not sufficiently widened in the Y direction, and thus, it is determined that the streaky irregularity is clearly observed, and the evaluation of streaky irregularity is set as "x".

In the evaluation of hot spot, first, the simulation model of the above-described dimensions (X×Y: 30 mm×50 mm) is divided into 10000 points, and the light intensity is calculated. Next, as illustrated in FIG. 8(b), light intensity distribution on a line C1, which is a line parallel to the X direction and passes through the center of the point light source and light intensity distribution on a line C2, which is a line parallel to the X direction and passes through a point between adjacent point light sources (the darkest portion in the light source unit) are obtained. Next, at the positions in the same X direction, a light intensity D1 on the line C1 and a light intensity D2 on the line C2 are compared. If 100×D2/D1≤110% in the entire range of the X direction, it is determined that the hot spot is not observed, and the evaluation of hot spot is set as "⊙". In addition, if 100×D2/D1 exceeds 110% in a portion of the X direction but 100×D2/D1≤130% in the entire range of the X direction, although slight hot spot is observed, it is determined that the product is in a sufficiently usable range, and the evaluation of streaky irregularity is set as "○". On the other hand, if 100×D2/D1≤130% in at least a portion of the X direction, it is determined that the hot spot is clearly observed, and the evaluation of hot spot is set as "x".

TABLE 1

|  | Radius of Curvature r [μm] | Maximum Inclination Angle θ [°] | Ratio R [%] | Evaluation of Streaky Irregularity | Evaluation of Hot Spot | Overall Evaluation |
|---|---|---|---|---|---|---|
| Example 1 | 15.7 | 40 | 50 | ⊚ | ⊚ | ⊚ |
| Example 2 | 25.1 | 40 | 80 | ⊚ | ⊚ | ⊚ |
| Example 3 | 18.0 | 30 | 50 | ⊚ | ⊚ | ⊚ |
| Example 4 | 28.8 | 30 | 80 | ⊚ | ⊚ | ⊚ |
| Example 5 | 26.4 | 20 | 50 | ⊚ | ⊚ | ⊚ |
| Example 6 | 42.1 | 20 | 80 | ⊚ | ⊚ | ⊚ |
| Example 7 | 12.8 | 45 | 50 | ○ | ⊚ | ○ |
| Example 8 | 20.4 | 45 | 80 | ○ | ⊚ | ○ |
| Comparative Example 1 | 34.8 | 15 | 50 | ⊚ | X | X |
| Comparative Example 2 | 55.6 | 15 | 80 | ⊚ | X | X |
| Comparative Example 3 | 0.0 | 30 | 0 | X | ⊚ | X |
| Comparative Example 4 | — | — | — | X | ⊚ | X |
| Comparative Example 5 | — | — | — | ⊚ | X | X |

In the light guide plate in Example 1, since the radius of curvature r of the light-emitting-side unit optical shape is 15.7 μm, the maximum inclination angle θ is 40°, and the ratio R is 50%, the above-described radius of curvature r, maximum inclination angle θ, and ratio R are formed within the above-described respective desired numerical ranges. As a result, with respect to the light guide plate in Example 1, the evaluation of streaky irregularity becomes "⊚", and the evaluation of hot spot becomes "⊚", so that the overall evaluation becomes "⊚". In the light guide plate in Example 2, since the radius of curvature r of the light-emitting-side unit optical shape is 25.1 μm, the maximum inclination angle θ is 40°, and the ratio R is 80%, the above-described radius of curvature r, maximum inclination angle θ, ratio R are formed within the above-described respective desired numerical ranges. As illustrated in FIG. 9(a), in the light guide plate in Example 2, since B2/B1 becomes 5.22, and luminance in two end portions in the Y direction is increased at the position A2 of the light guide plate, the evaluation of streaky irregularity becomes "⊚". In addition, since 100× D2/D1 is equal to or less than 110% in the light guide direction (X direction) at all the positions, the evaluation of hot spot also becomes "⊚". As a result, with respect to the light guide plate in Example 2, the overall evaluation becomes "⊚".

In the light guide plate in Example 3, since the radius of curvature r of the light-emitting-side unit optical shape is 18.0 μm, the maximum inclination angle θ is 30°, and the ratio R is 50%, the above-described radius of curvature r, maximum inclination angle θ, and ratio R are formed within the above-described respective desired numerical ranges. As a result, with respect to the light guide plate in Example 3, the evaluation of streaky irregularity becomes "⊚", and the evaluation of hot spot becomes "⊚", so that the overall evaluation becomes "⊚". In the light guide plate in Example 4, since the radius of curvature r of the light-emitting-side unit optical shape is 28.8 μm, the maximum inclination angle θ is 30°, and the ratio R is 80%, the above-described radius of curvature r, maximum inclination angle θ, and ratio R are formed within the above-described respective desired numerical ranges. As a result, with respect to the light guide plate in Example 4, the evaluation of streaky irregularity becomes "⊚", and the evaluation of hot spot becomes "⊚", so that the overall evaluation becomes "⊚".

In the light guide plate in Example 5, since the radius of curvature r of the light-emitting-side unit optical shape is 26.4 μm, the maximum inclination angle θ is 20°, and the ratio R is 50%, the above-described radius of curvature r, maximum inclination angle θ, and ratio R are formed within the above-described respective desired numerical ranges. As a result, with respect to the light guide plate in Example 5, the evaluation of streaky irregularity becomes "⊚", and the evaluation of hot spot becomes "⊚", so that the overall evaluation becomes "⊚". In the light guide plate in Example 6, since the radius of curvature r of the light-emitting-side unit optical shape is 42.1 μm, the maximum inclination angle θ is 20°, and the ratio R is 80%, the above-described radius of curvature r, maximum inclination angle θ, and ratio R are formed within the above-described respective desired numerical ranges. As a result, with respect to the light guide plate in Example 6, the evaluation of streaky irregularity becomes "⊚", and the evaluation of hot spot becomes "⊚", so that the overall evaluation becomes "⊚".

In the light guide plate in Example 7, since the radius of curvature r of the light-emitting-side unit optical shape is 12.8 μm, the maximum inclination angle θ is 45°, and the ratio R is 50%, the above-described radius of curvature r, maximum inclination angle θ, and ratio R are formed within the above-described respective desired numerical ranges. As a result, with respect to the light guide plate in Example 7, the evaluation of streaky irregularity becomes "○", and the evaluation of hot spot becomes "⊚", so that the overall evaluation becomes "○". In the light guide plate in Example 8, since the radius of curvature r of the light-emitting-side unit optical shape is 20.4 μm, the maximum inclination angle θ is 45°, and the ratio R is 80%, the above-described radius of curvature r, maximum inclination angle θ, and ratio R are formed within the above-described respective desired numerical ranges. As a result, with respect to the light guide plate in Example 8, the evaluation of streaky irregularity becomes "○", and the evaluation of hot spot becomes "⊚", so that the overall evaluation becomes "○".

In the light guide plate in Comparative Example 1, since the radius of curvature r of the light-emitting-side unit optical shape is 34.8 μm, the maximum inclination angle θ is 15°, and the ratio R is 50%, the above-described radius of curvature r and ratio R are formed within the above-described respective desired numerical ranges, but the maximum inclination angle θ is a value outside the lower limit value of the desired range. As a result, with respect to the light guide plate in Comparative Example 1, although the evaluation of streaky irregularity becomes "⊙", the evaluation of hot spot becomes "x", so that the overall evaluation becomes "x". In the light guide plate in Comparative Example 2, since the radius of curvature r of the light-emitting-side unit optical shape is 55.6 μm, the maximum inclination angle θ is 15°, and the ratio R is 80%, the above-described radius of curvature r and ratio R are formed within the above-described respective desired numerical ranges, but the maximum inclination angle θ is a value outside the lower limit value of the desired range. As a result, with respect to the light guide plate in Comparative Example 2, although the evaluation of streaky irregularity becomes "⊙", the evaluation of hot spot becomes "x", so that the overall evaluation becomes "x". In the light guide plate in Comparative Example 3, since the light-emitting-side unit optical shape is formed in a shape where the cross section in the YZ plane is recessed in a substantially triangular shape, the radius of curvature r of the light-emitting-side unit optical shape is 0.0 μm, the maximum inclination angle θ is 30°, and the ratio R is 0%, the above-described maximum inclination angle θ is formed within the above-described desired range, but the radius of curvature r and the ratio R have values outside the above-described respective desired numerical ranges. As a result, with respect to the light guide plate in Comparative Example 3, although the evaluation of hot spot becomes "⊙", the evaluation of streaky irregularity becomes "x", so that the overall evaluation becomes "x".

As described above, the light guide plate in Comparative Example 4 is formed so that the light-emitting-side unit optical shape is convex toward the Z2 side from the light emitting surface, and the cross-sectional shape in the YZ cross section is a pentagonal shape. In addition, the light-emitting-side unit optical shape in Comparative Example 4 is formed so that the ratio (W5/W4) of the width W5 of the inclined surface of the Z2 side interposing the vertex t to the width W4 in the arrangement direction (Y direction) is 60%. In the light guide plate in Comparative Example 4, as illustrated in FIG. 9(b), the with B2/B1 becomes 4.33, and at the position A2 of the light guide plate, the luminance in two end portions in the Y direction is greatly decreased in comparison with the luminance in the central portion, so that the evaluation of streaky irregularity becomes "x". On the contrary, since 100×D2/D1 is equal to or less than 110% in the light guide direction (X direction) at all positions, the evaluation of hot spot becomes "⊙". As a result, with respect to the light guide plate in Comparative Example 4, the overall evaluation becomes "x". Similarly to the light guide plate in Comparative Example 4, the light guide plate in Comparative Example 5 is formed so that the light-emitting-side unit optical shape is convex toward the Z2 size from the light emitting surface, and the cross-sectional shape in the YZ cross section is a pentagonal shape. In addition, the light-emitting-side unit optical shape in Comparative Example 5 is formed so that the ratio (W5/W4) of the width W5 of the inclined surface of the Z2 side interposing the vertex t to the width W4 in the arrangement direction (Y direction) is 80%. Herein, as illustrated in FIG. 9(c), in the light guide plate in Comparative Example 5, since B2/B1 becomes 5.56 and luminance in two end portions in the Y direction is increased at the position A2 of the light guide plate, the evaluation of streaky irregularity becomes "⊙". However, since there is a plurality of positions where 100×D2/D1 exceeds 130% in the light guide direction (X direction), the evaluation of hot spot becomes "x". As a result, with respect to the light guide plate in Comparative Example 5, the overall evaluation becomes "x".

Heretofore, like the light guide plates in Comparative Examples 1 to 3, if at least either the radius of curvature r or the maximum inclination angle θ do not satisfy the numerical range, it is observed that the evaluation of streaky irregularity or the evaluation of hot spot becomes "x". In addition, in Comparative Examples 4 and 5, the ratio (W5/W4) of the width W5 of the light-emitting-side unit optical shape to the width W4 of the inclined surface in the Z2 side may be changed. However, it is found that, in the case where the evaluation of hot spot is "⊙" like Comparative Example 4, the evaluation of streaky irregularity becomes "x", and in the case where the evaluation of streaky irregularity is "⊙" like Comparative Example 5, the evaluation of hot spot becomes "x". On the contrary, in the light guide plates in Examples 1 to 8, it is found that, if the radius of curvature r, the maximum inclination angle θ, and the ratio R of the light-emitting-side unit optical shape are formed within the above-described respective desired numerical ranges, it is possible to prevent the streaky irregularity from occurring and to prevent the hot spot from occurring.

The light guide plate 13 according to the embodiment described heretofore can achieve the following effects.

(1) In the light guide plate 13 according to the embodiment, the light-emitting-side unit optical shape 135 is formed in a groove shape where the light-emitting-side unit optical shape extends in the light guide direction (Y direction) and is recessed from the light emitting surface 13c, the bottom 135c of the groove shape is formed on the concave surface 135a, which is concave toward the back surface 13d side, and the inclined surfaces 135b, which are inclined from the edge portion 135d toward the bottom 135c side, are formed in the two end portions of the concave surface 135a. The maximum inclination angle θ between the surface tangential to the inclined surface 135b and the light emitting surface 13c satisfies 20°≤θ≤45°, and the radius of curvature r of the concave surface 135a satisfies r≥W21/(4×sin θ). Therefore, in the light guide plate 13 according to the embodiment, the light guided inside the light guide plate can be widened more in the Y direction to be emitted, and thus, even though color irregularity or luminance irregularity exists in the LED used for the light source unit 12, it is possible to prevent streaky irregularity from occurring in the central portion of the light emitting surface and to prevent hot spot from occurring in the vicinity of the light incident surface. In addition, by configuring the light-emitting-side unit optical shape 135 according to the embodiment in this form, it is possible to easily remove extraneous substances such as dust adhered to the light emitting surface of the light guide plate 13 with a flow of air or the like.

(2) In the light guide plate 13 according to the embodiment, the light-emitting-side unit optical shape 135 is formed so that the ratio R=W22/W21 of the width W22 of the concave surface 135a to the width W21 of the light-emitting-side unit optical shape 135 in the arrangement direction is 50%≤R≤80%. Therefore, it is possible to achieve an effect of effectively preventing the above-described streaky irregularity and hot spot.

Second Embodiment

Figure 10A:
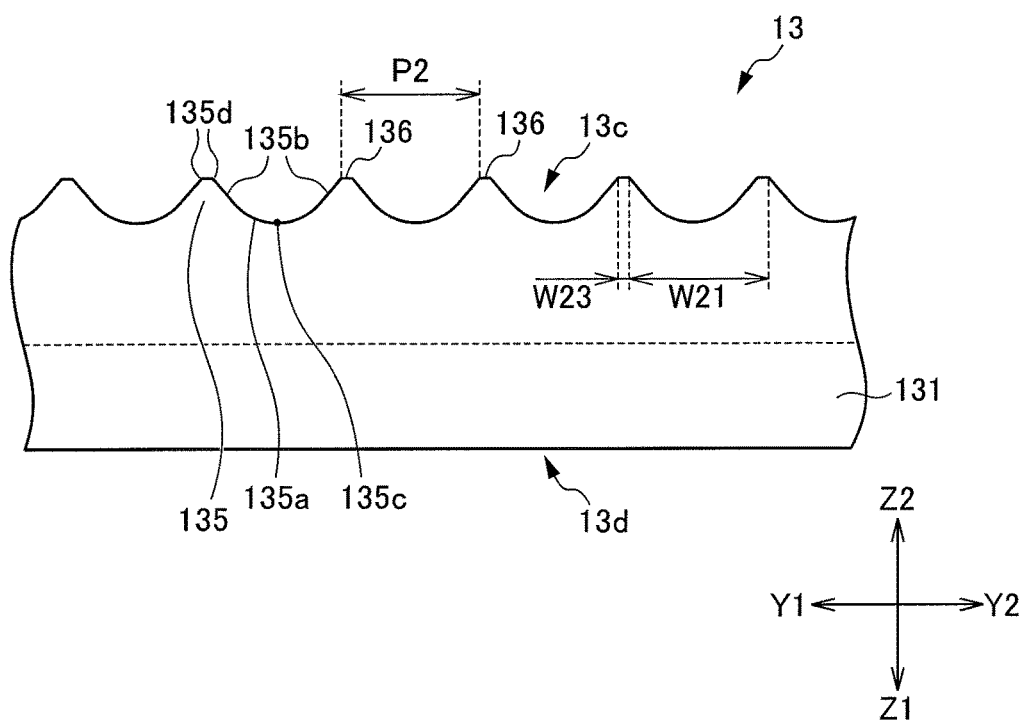
FIG. 10 is a diagram illustrating a shape of a light guide plate 13 according to a second embodiment.
Figure 10B:
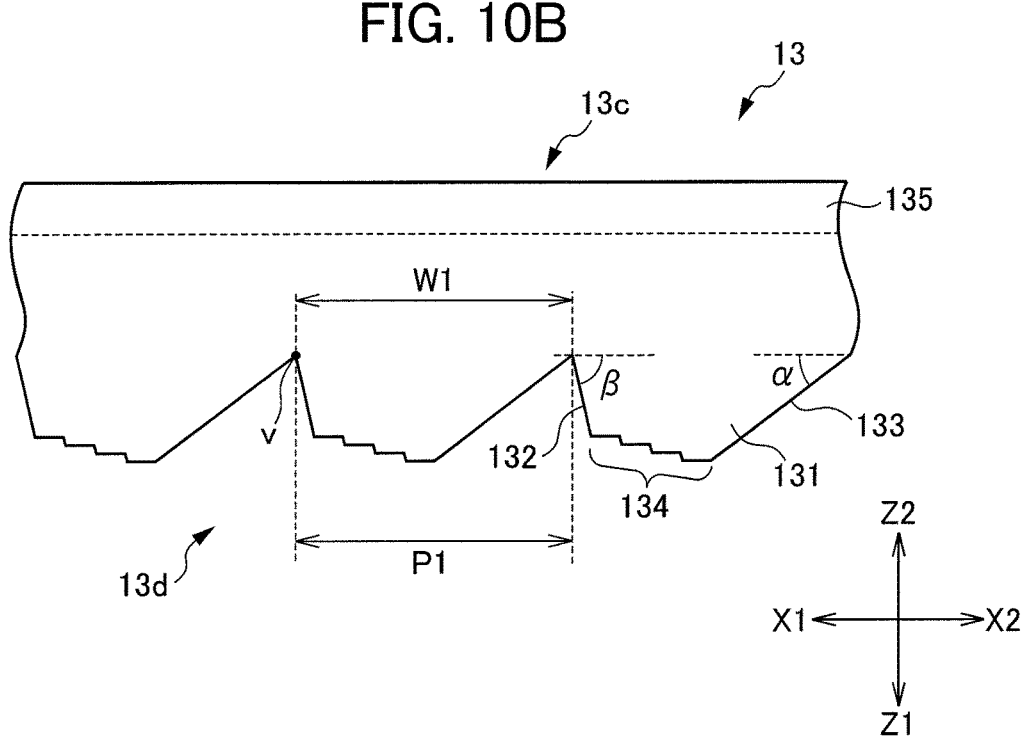
Figure 11:
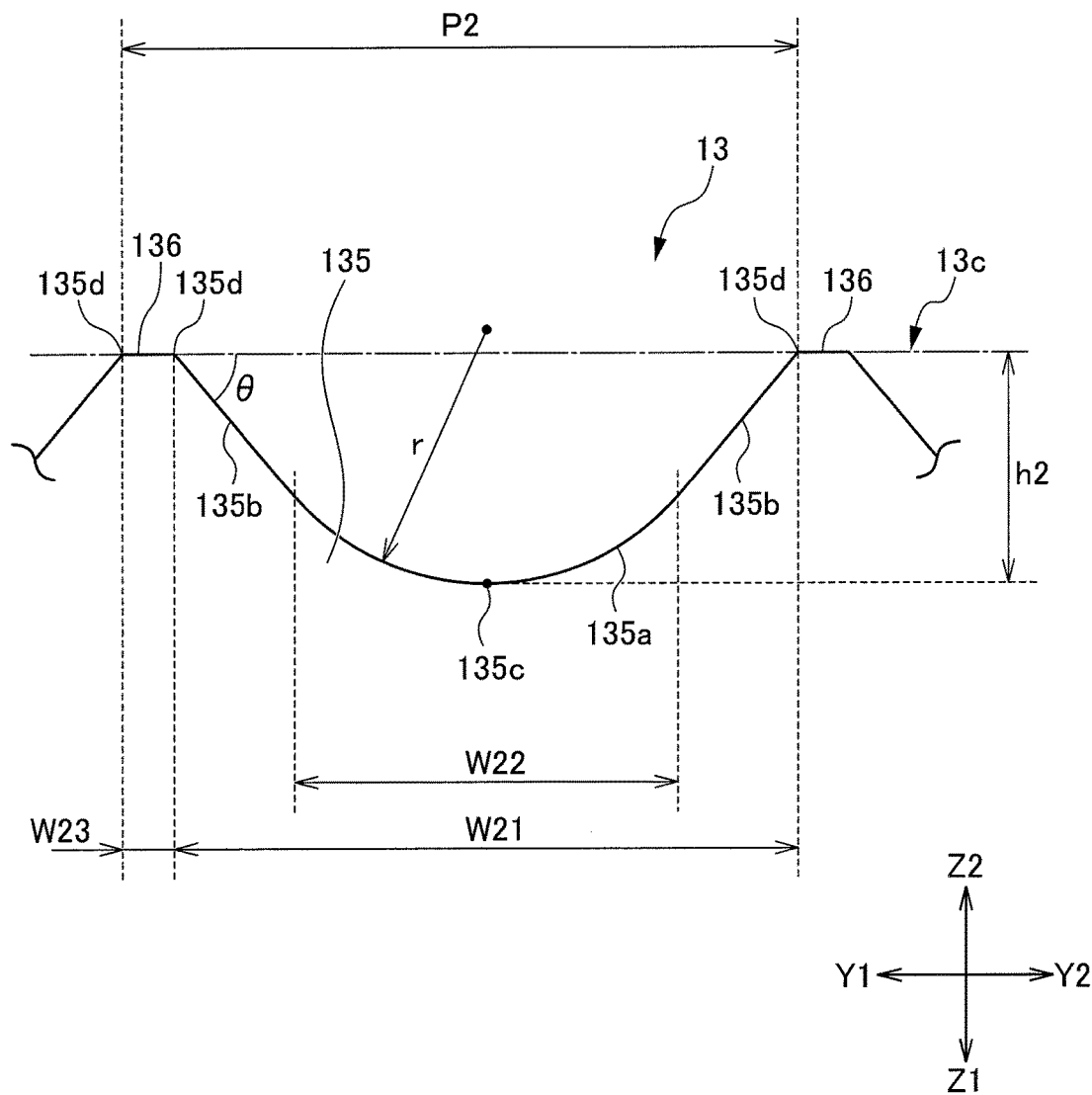
FIG. 11 is a diagram illustrating details of a light-emitting-side unit optical shape 135 according to the second embodiment.

Next, a light guide plate 13 according to a second embodiment will be described. FIG. 10 is a diagram illustrating a shape of the light guide plate 13 according to the embodiment. FIG. 10(a) is diagram illustrating a light-emitting-side unit optical shape 135, and FIG. 10(b) is a diagram illustrating a back-surface-side unit optical shape 131. In FIG. 10(a), a portion of a cross section of the light guide plate 13 parallel to the YZ plane is illustrated enlarged, and in FIG. 10(b), a portion of a cross section of the light guide plate 13 parallel to the XZ plane is illustrated enlarged. FIG. 11 is a diagram illustrating details of a light-emitting-side unit optical shape 135 according to the embodiment. In FIG. 11, a portion of a cross section of the light guide plate 13 parallel to the YZ plane illustrated in FIG. 10(a) is illustrated enlarged further. In the description and drawings hereinafter, the components fulfilling the same functions as those of the above-described first embodiment are denoted by the same reference numerals or are denoted by the same reference numerals in the end section, and the redundant description is appropriately omitted.

As illustrated in FIG. 10(a), the light guide plate 13 according to the embodiment is different from the light guide plate 13 according to the first embodiment described above in that flat portions 136 are provided between adjacent light-emitting-side unit optical shapes 135. As illustrated in 10, in the light guide plate 13, a plurality of light-emitting-side unit optical shapes 135 are formed to be arranged on a light emitting surface 13c and a plurality of back-surface-side unit optical shapes 131 are formed to be arranged on a back surface 13d.

As illustrated in FIG. 10(a), the light-emitting-side unit optical shape 135 is formed in a groove shape which is recessed from a light emitting surface side (LCD panel 11 side, Z2 side) and extends in the X direction (light guide direction), and a plurality of the light-emitting-side unit optical shapes are arranged in the Y direction to be adjacent to each other. As illustrated in FIG. 10(a) and FIG. 11, in the light-emitting-side unit optical shape 135, a bottom 135c of the groove shape is formed on a concave surface 135a which is concave toward the back surface 13d side, and a flat inclined surfaces 135b which are inclined from an edge portion 135d of the groove shape toward the bottom 135c side, are formed in two end portions of the concave surface 135a in the Y direction. The light-emitting-side unit optical shape 135 is formed to be symmetrical with respect to a boundary line which passes through the bottom 135c and is parallel to the thickness direction (Z direction) in the cross section illustrated in FIG. 11.

Therefore, in the light guide plate 13 according to the embodiment, the light guided inside the light guide plate can be widened more in the Y direction to be emitted, and thus, even though color irregularity or luminance irregularity exists in the LED used for the light source unit 12, it is possible to prevent streaky irregularity from occurring in the central portion of the light emitting surface and to prevent hot spot from occurring in the vicinity of the light incident surface. In addition, by configuring the light-emitting-side unit optical shape 135 according to the embodiment in this form, it is possible to easily remove extraneous substances such as dust adhered to the light emitting surface of the light guide plate 13 with a flow of air or the like.

Figure 12:
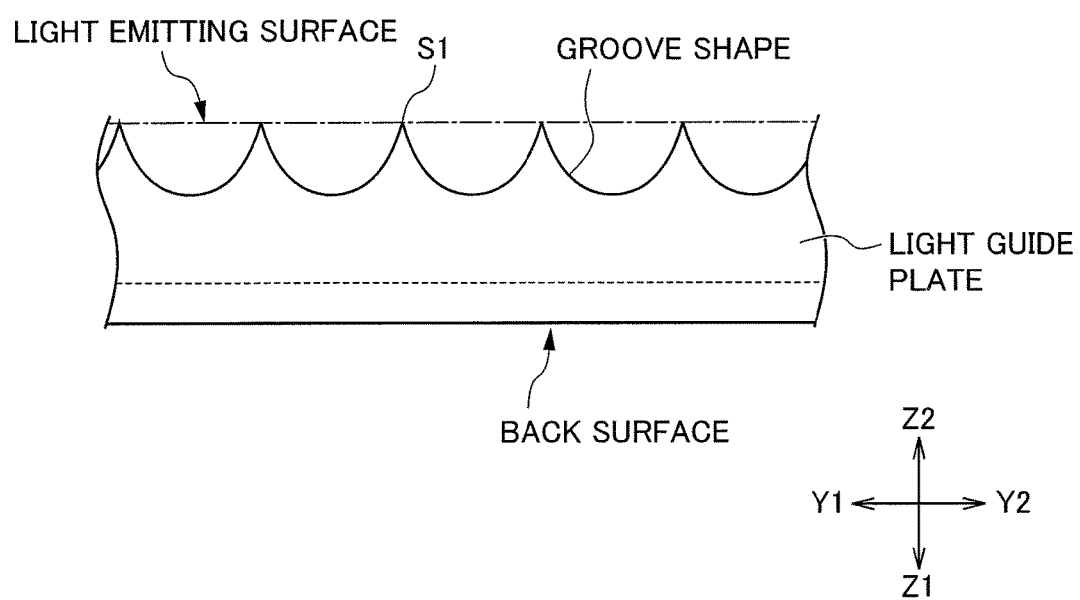
FIG. 12 is a diagram illustrating a shape of a light emitting surface of a light guide plate in Comparative Examples.

FIG. 12 is a diagram illustrating a shape of the light emitting surface of the light guide plate in Comparative Examples. FIG. 12 is a diagram corresponding to FIG. 10(a). Herein, as illustrated in FIG. 1, a deflection optical sheet such as a prism sheet 15 is arranged on the light emitting surface of the light guide plate. Therefore, in the case when the light-emitting-side unit optical shape is formed on the light emitting surface of the light guide plate, a contact area between the light emitting surface of the light guide plate and the prism sheet becomes small. For example, as illustrated in FIG. 12, in the case when groove shapes of which cross-sectional shape in the surface (YZ plane) perpendicular to the light guide direction is formed to be substantially arc shaped are arranged without a gap in the Y direction of the light emitting surface of the light guide plate, a boundary portion s1 of each groove shape becomes a contact portion with respect to the prism sheet, and thus, the contact area between the light guide plate and the prism sheet becomes very small.

In this manner, if the contact area between the light guide plate and the prism sheet becomes small, due to vibration generated in transportation in the state that the light guide plate and the prism sheet are stacked or when performing an assembling process of the surface light source device or the display device, in some cases, the surface of the prism sheet in the light guide plate side may be damaged, or the boundary portion s1 between the light-emitting-side unit optical shapes of the light guide plate may be damaged or destroyed. Particularly, like the prism sheet illustrated in FIG. 6, in the case when the unit prisms are formed on the surface in the light guide plate side, the contact area between the light guide plate and the prism sheet is even smaller, so that the above-described scratches or destruction more easily occur. In addition, in some cases, fine dust or the like attached to the light guide plate or the prism sheet is caught in the contact portion, and the light guide plate or the prism sheet is damaged or destroyed.

Therefore, in order to avoid the above-described problem, in the light guide plate 13 according to the embodiment, the flat portions 136 which are substantially parallel to the light emitting surface 13c are provided between the adjacent light-emitting-side unit optical shapes 135. In the light emitting surface 13c of the light guide plate 13, since the light-emitting-side unit optical shape 135 is formed in a groove shape where the light-emitting-side unit optical shape is recessed from the light emitting surface 13c, the flat portion 136 becomes a portion which is located closest to the light emitting side (Z2 side) in the thickness direction (Z direction) of the light guide plate 13, so that the flat portion is in contact with the prism sheet 15 stacked on the light emitting surface 13c. In this manner, by providing the flat portions 136 between the light-emitting-side unit optical shapes 135, in the light guide plate 13, the contact area between the light emitting surface 13c and the surface of the prism sheet 15 on the light guide plate 13 side can be increased. Therefore, in the light guide plate 13, it is possible to very much prevent the boundary portion (flat portion 136) of the light-emitting-side unit optical shape 135 or the surface of the prism sheet 15 in the light guide plate 13 side from being damaged or destroyed.

Herein, the configuration where the flat portion 136 is substantially parallel to the light emitting surface 13c denotes a configuration including a case when the flat portion 136 is inclined slightly (for example, inclined in a range of ±5 degrees with respect to the light emitting surface) with respect to the light emitting surface 13c as well as a case when the flat portion 136 is exactly parallel to the light emitting surface 13c. In addition, the flat portion 136 denotes a surface including a surface formed in a concave surface shape which is slightly curved toward the Z1 side or a convex surface shape which is slightly curved toward the Z2 side (radius of curvature of the concave surface and the convex surface is, for example, 10 μm or more) as well as an exactly flat surface.

An arrangement pitch of the light-emitting-side unit optical shape 135 is P2, and a width of the light-emitting-side unit optical shape 135 in the arrangement direction (Y direction) is W21. In addition, a width of the flat portion 136 in the arrangement direction (Y direction) is W23. In the embodiment, since the light-emitting-side unit optical shapes 135 and the flat portions 136 are alternately arranged, the arrangement pitch P2 becomes a sum of the width W21 of the light-emitting-side unit optical shape 135 and the width W23 of the flat portion 136 (P2=W21+W23). In addition, a maximum inclination angle between a surface tangential to the inclined surface 135b of the light-emitting-side unit optical shape 135 and the light emitting surface 13c (plate surface of the light guide plate 13 on the light emitting side, the surface parallel to the XY plane, the surface indicated by one-dot dashed line in FIG. 11) of the light guide plate 13 is θ. In addition, a distance (hereinafter, referred to as a depth of the light-emitting-side unit optical shape 135) from the light emitting surface 13c (plate surface of the light guide plate 13 in the light emitting side, the surface parallel to the XY plane, the surface indicated by one-dot dashed line in FIG. 11) of the light guide plate 13 to the bottom 135c of the light-emitting-side unit optical shape 135 is h2. In addition, the width of the concave surface 135a formed on the light-emitting-side unit optical shape 135 in the arrangement direction (Y direction) is W22.

It is preferable that the arrangement pitch P2 is in a range of from about 10 to about 100 μm. If the arrangement pitch P2 is smaller than this range, the light-emitting-side unit optical shape 135 is difficult to manufacture, and thus, the shape in accordance with the design cannot be achieved. In addition, if the arrangement pitch P2 is larger than this range, moire to pixels of the LCD panel 11 easily occurs, or in the state used as the surface light source device 10 or the like, the pitch of the light-emitting-side unit optical shapes 135 is easily recognized. Therefore, it is preferable that the arrangement pitch P2 is set to the above range.

It is preferable that the width W23 of the flat portion 136 is formed in a range of 0.5 μm≤W23≤2.5 μm. If the width W23 of the flat portion 136 is smaller than 0.5 μm, the width of the flat portion 136 becomes too small, and thus, the flat portion 136 or the surface of the prism sheet 15 in the light guide plate side is damaged or destroyed, which is not preferable. In addition, if the width W23 of the flat portion 136 is larger than 2.5 μm, although the light guide plate 13 and the prism sheet 15 are prevented from being damaged or the like, a large amount of hot spot may occur in the light emitted from the light guide plate 13, which is not preferable. From the point of view of effectively preventing the hot spot from occurring in the light emitted from the light guide plate 13, it is preferable that the width W23 is equal to or smaller than 2.0 μm (W23≤2.0 μm).

(Evaluation of Occurrence of Scratches in Test Specimen)

Figure 13:
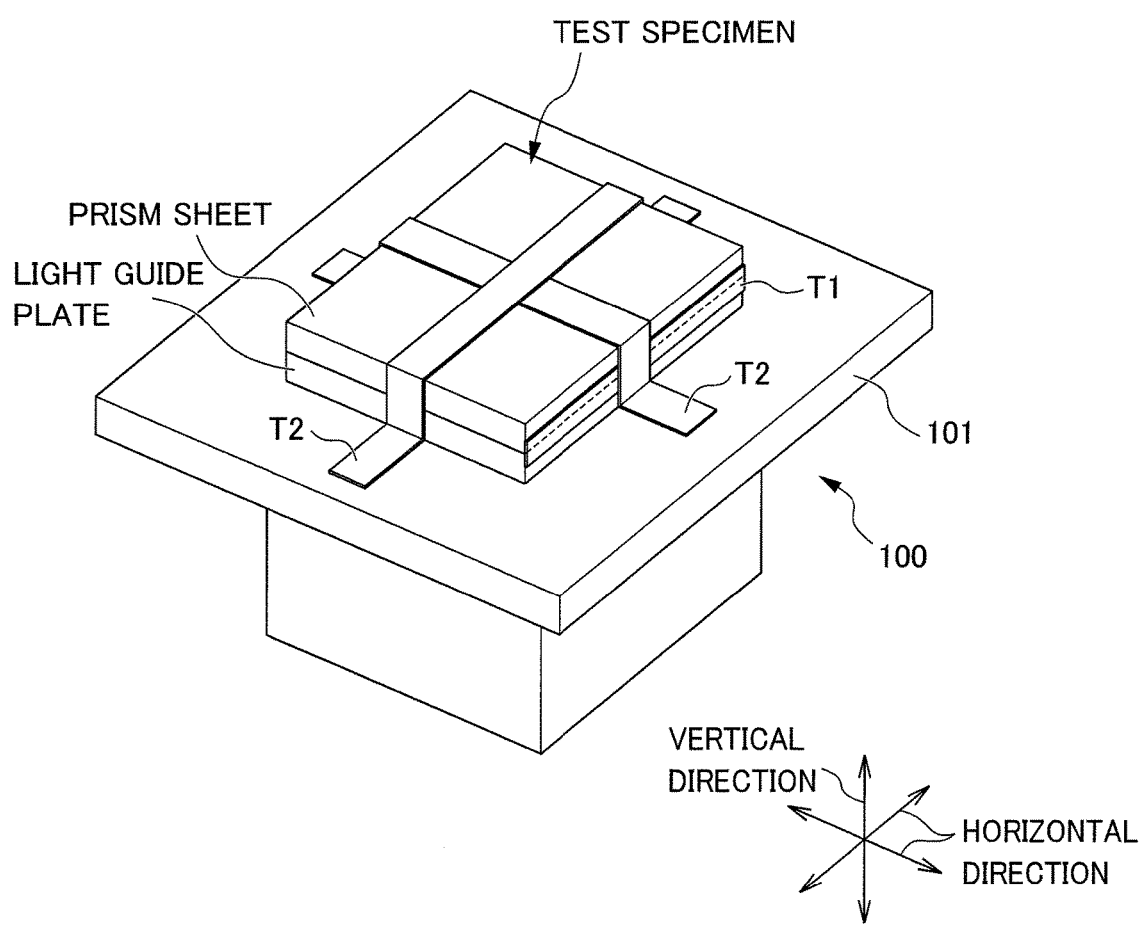
FIG. 13 is a diagram illustrating a state of a vibration test of a test specimen used for evaluation.

Next, plural types of light guide plates having different widths W23 of a flat portion of a light emitting surface are manufactured, each test specimen (test specimens 1 to 18) is vibrated by a vibration tester when a prism sheet (refer to FIG. 6) is stacked on a light guide plate, and the results of evaluation test of scratches or destruction occurring in the light guide plate and the prism sheet caused by the vibration are described. FIG. 13 is a diagram illustrating a state of a vibration test of a test specimen used for evaluation. FIG. 14 is a diagram illustrating a summary of results of evaluation of test specimens.

As described above, each test specimen used for the evaluation is configured to include a light guide plate and a prism sheet stacked on a light emitting surface of the light guide plate. Herein, the light guide plate and the prism sheet are fixed to each other by adhering an adhesive tape T1 to two facing sides. As illustrated in FIG. 13, each test specimen is fixed on a vibration stage 101 of a vibration tester 100 by adhesive tapes T2. A BF-50 UC produced by IDEX Co., ltd. is used as the vibration tester 100. The vibration tester can vibrate the vibration stage at a predetermined frequency and accelerate at random in the three directions of vertical and horizontal directions. In this evaluation test, the vibration tester 100 vibrates the vibration stage 101 where the test specimen is fixed at a frequency of 67 Hz and an acceleration of 10 G. The light guide plate and the prism sheet used for each test specimen are formed to have a diagonal size of 8 inches.

In addition, similarly to the above-described embodiment (refer to FIG. 6), in the prism sheet used for each test specimen, a plurality of unit prisms are arranged on a surface facing the light guide plate, and the prism sheet is formed with an ultraviolet-curable acrylic resin. The prism sheet used for each test specimen has a Young's modulus of 63.1 MPa and a restoring power of 29.0%. In the prism sheet used for the test specimens 1 to 6, the apex angle s of the unit prism is 58.5 degrees. In the prism sheet used for the test specimens 7 to 12, the apex angle E of the unit prism is 68.1 degrees. In the prism sheet used for the test specimens 13 to 18, the apex angle s of the unit prism is 75.0 degrees. The prism sheet used for each test specimen is made of acrylic acid 2-ethylhexyl, phenoxyethyl acrylate, EO-modified bisphenol A diacrylate, 2-hydroxyethyl acrylate, hexamethylene diisocyanate, lucirin TPO, triphenyl phosphate, fluorochemical surfactant, or the like.

The light guide plates used for the test specimens 1, 7, and 13 have a form when a plurality of the groove shapes configured with a concave surface and inclined surfaces are arranged without a gap in the Y direction on the light emitting surface, in other words, no flat portion is formed between the light-emitting-side unit optical shapes (groove shapes) (refer to FIG. 12). Therefore, in the light guide plates used for test specimens 1, 7, and 13, the width W23 of the flat portion is W23=0 μm. In the light guide plates used for test specimens 2 to 6, 8 to 12, and 14 to 18, a plurality of the light-emitting-side unit optical shapes (groove shapes) configured with the concave surface and the inclined surfaces and a plurality of the flat portions are alternately arranged on the light emitting surface in the Y direction (refer to FIG. 10(a) or the like). The test specimens 2 to 6 are different from each other in terms of the width W23 of the flat portion. Similarly, the test specimens 8 to 12 are different from each other in terms of the width W23 of the flat portion. Similarly, the test specimens 14 to 18 are different from each other in terms of width W23 of the flat portion.

The width W23 of the flat portion of the light guide plate used for the test specimen 2 is W23=0.5 μm. The width W23 of the flat portion of the light guide plate used for the test specimen 3 is W23=1.5 μm. The width W23 of the flat portion of the light guide plate used for the test specimen 4 is W23=2.0 μm. The width W23 of the flat portion of the light guide plate used for the test specimen 5 is W23=2.5 μm. The width W23 of the flat portion of the light guide plate used for the test specimen 6 is W23=3.6 μm. The width W23 of the flat portion of the light guide plate used for the test specimen 8 is W23=0.5 μm. The width W23 of the flat portion of the light guide plate used for the test specimen 9 is W23=1.5 μm. The width W23 of the flat portion of the light guide plate used for the test specimen 10 is W23=2.0 μm. The width W23 of the flat portion of the light guide plate used for the test specimen 11 is W23=2.5 μm. The width W23 of the flat portion of the light guide plate used for the test specimen 12 is W23=3.6 μm.

The width W23 of the flat portion of the light guide plate used for the test specimen 14 is W23=0.5 µm. The width W23 of the flat portion of the light guide plate used for the test specimen 15 is W23=1.5 µm. The width W23 of the flat portion of the light guide plate used for the test specimen 16 is W23=2.0 µm. The width W23 of the flat portion of the light guide plate used for the test specimen 17 is W23=2.5 µm. The width W23 of the flat portion of the light guide plate used for the test specimen 18 is W23=3.6 µm. The light guide plate used for each test specimen is formed with a thermoplastic acrylic resin, and the Young's modulus thereof is 3.0 GPa.

A summary of the results of evaluation of scratches and destruction of each test specimen and the results of evaluation of hot spot of the light guide plate used for each test specimen are illustrated in FIG. 14. In FIG. 14, the "number of occurrences of scratches or the like" indicates the results obtained by visually observing the number of occurrences of scratches or destruction such as cracks on the light emitting surface of the light guide plate or the surface of the prism sheet in the light guide plate side due to the vibration test by the above-described vibration tester. In addition, in FIG. 14, the "hot spot" indicates the results obtained by observing whether or not luminance irregularity (hot spot) occurs in the vicinity of the light incident surface of the light emitting surface in the case where the light source is arranged on the light incident surface of the light guide plate used for each test specimen and light is allowed to be incident. With respect to the evaluation of hot spot, a case where hot spot is not observed is set as "○", a case where slight hot spot is observed but the product is sufficiently usable is set as "Δ", and a case where hot spot is clearly observed is set as "x". In FIG. 14, with respect to the overall evaluation, a case where scratch does not occur in the light guide plate or the prism sheet and the evaluation of hot spot is "○" is set as "⊙", a case when scratches do not occur in the light guide plate or the prism sheet but the evaluation of hot spot is "Δ" or "x" is set as "○", a case where scratches occur in the light guide plate or the prism sheet is set as "x".

(Results of Evaluation for Test Specimens (1 to 6) Using Prism Sheet Having Apex Angle c=58.5°)

As illustrated in FIG. 14, with respect to the test specimen 1 including a light guide plate having no flat portion, although the evaluation of hot spot is "○", since three scratch positions or the like are observed in the light guide plate or the prism sheet, the overall evaluation becomes "x". With respect to the test specimen 5, although scratches or the like are not observed in the light guide plate or the prism sheet, since the evaluation of hot spot becomes "Δ", the overall evaluation becomes "○". With respect to the test specimen 6, although scratches or the like are not observed in the light guide plate or the prism sheet, since the evaluation of hot spot becomes "x", the overall evaluation becomes "○". On the contrary, with respect to the test specimens 2 to 4, since scratches or the like are not observed in the light guide plate or the prism sheet and the evaluation of hot spot is "○", the overall evaluation becomes "⊙".

(Results of Evaluation for Test Specimens (7 to 12) Using Prism Sheet Having Apex Angle ε=68.1°

As illustrated in FIG. 14, with respect to the test specimen 7 including a light guide plate having no flat portion, although the evaluation of hot spot is "○", since two scratch positions or the like are observed in the light guide plate or the prism sheet, the overall evaluation becomes "x". With respect to the test specimen 11, although scratches or the like are not observed in the light guide plate or the prism sheet, since the evaluation of hot spot becomes "A", the overall evaluation becomes "○". With respect to test specimen 12, although scratches or the like are not observed in the light guide plate or the prism sheet, since the evaluation of hot spot becomes "x", the overall evaluation becomes "○". On the contrary, with respect to test specimens 8 to 10, since scratches or the like are not observed in the light guide plate or the prism sheet and the evaluation of hot spot is "○", the overall evaluation becomes "⊙".

(Results of Evaluation for Test Specimens (13 to 18) Using Prism Sheet Having Apex Angle ε=75.0°)

As illustrated in FIG. 14, with respect to the test specimen 13 including a light guide plate having no flat portion, although the evaluation of hot spot is "○", since two scratch positions or the like are observed in the light guide plate or the prism sheet, the overall evaluation becomes "x". With respect to the test specimen 17, although scratches or the like are not observed in the light guide plate or the prism sheet, since the evaluation of hot spot becomes "Δ", the overall evaluation becomes "○". With respect to the test specimen 18, although scratches or the like are not observed in the light guide plate or the prism sheet, since the evaluation of hot spot becomes "x", the overall evaluation becomes "○". On the contrary, with respect to the test specimens 14 to 16, since scratches or the like are not observed in the light guide plate or the prism sheet and the evaluation of hot spot is "○", the overall evaluation becomes "⊙".

It is found from the above-described results that if the width W23 of the flat portion is equal to or larger than 0.5 µm, it is possible to sufficiently prevent scratches or the like from occurring in the light guide plate and the prism sheet. In addition, if the width 23 of the flat portion is larger than 2.5 µm, the occurrence of scratches or the like can be avoided, but it is found that hot spot easily occurs in the light emitted from the light guide plate. In addition, it is found that, if the width 23 of the flat portion is equal to or smaller than 2.0 µm, the hot spot can be sufficiently prevented from occurring. Therefore, it is found that if the width W23 of the flat portion of the light guide plate satisfies $0.5\ \mu m \leq W23 \leq 2.5$ µm, it is possible to prevent scratches or the like from occurring and to obtain good light emitting characteristic of the light guide plate. In addition, it is found that if the width of the flat portion satisfies $0.5\ \mu m \leq W23 \leq 2.0$ µm, it is possible to further prevent hot spot from occurring and to obtain better light emitting characteristics of the light guide plate. In addition, it is found that, even in the case when apex angles ε of the unit prisms of the prism sheet are different, the tendency of the occurrence of scratches or the like and the occurrence of hot spot is the same among the test specimens 1 to 6, the test specimens 7 to 12, and the test specimens 13 to 18, and thus, even in the case when the apex angle s becomes more acute like test specimens 1 to 6, it is possible to prevent the occurrence of scratches or the like and to obtain good light emitting characteristics of the light guide plate.

The light guide plate 13 according to the embodiment described heretofore can achieve the following effects.

(1) In the light guide plate 13 according to the embodiment, the flat portions 136 which are substantially parallel to the light emitting surface 13c are provided between the adjacent light-emitting-side unit optical shapes 135. Therefore, in the case when a deflection optical sheet such as the prism sheet 15 is arranged on the light emitting surface 13c of the light guide plate 13, it is possible to very much prevent the prism sheet 15 or the boundary portion (flat portion 136) between the light-emitting-side unit optical shapes 135 from being damaged or destroyed.

(2) In the light guide plate 13 according to the embodiment, since the width W23 of the flat portion 136 in the arrangement direction of the light-emitting-side unit optical shapes 135 is 0.5 µm≤W23≤2.5 µm, it is possible to efficiently prevent the light guide plate or the prism sheet from being damaged or the like and to prevent hot spot from occurring in the light emitted from the light guide plate.

(3) In the light guide plate 13 according to the embodiment, since the width W23 of the flat portion 136 in the arrangement direction of the light-emitting-side unit optical shapes 135 is 0.5 µm≤W23≤2.0 µm, it is possible to more efficiently prevent the light guide plate or the prism sheet from being damaged or the like and to more efficiently prevent hot spot from occurring in the light emitted from the light guide plate.

(4) In the light guide plate 13 according to the embodiment, since the bottom 135c of the light-emitting-side unit optical shape 135 (groove shape) is formed on the concave surface 135a which is concave toward the back surface side (Z1 side), the light guided inside the light guide plate can be widened more in the Y direction to be emitted, and thus, although color irregularity or luminance irregularity exists in the LED used for the light source unit 12, it is possible to prevent streaky irregularity from occurring in the central portion of the light emitting surface and to prevent hot spot from occurring in the vicinity of the light incident surface.

MODIFIED EMBODIMENTS

Figure 17A:
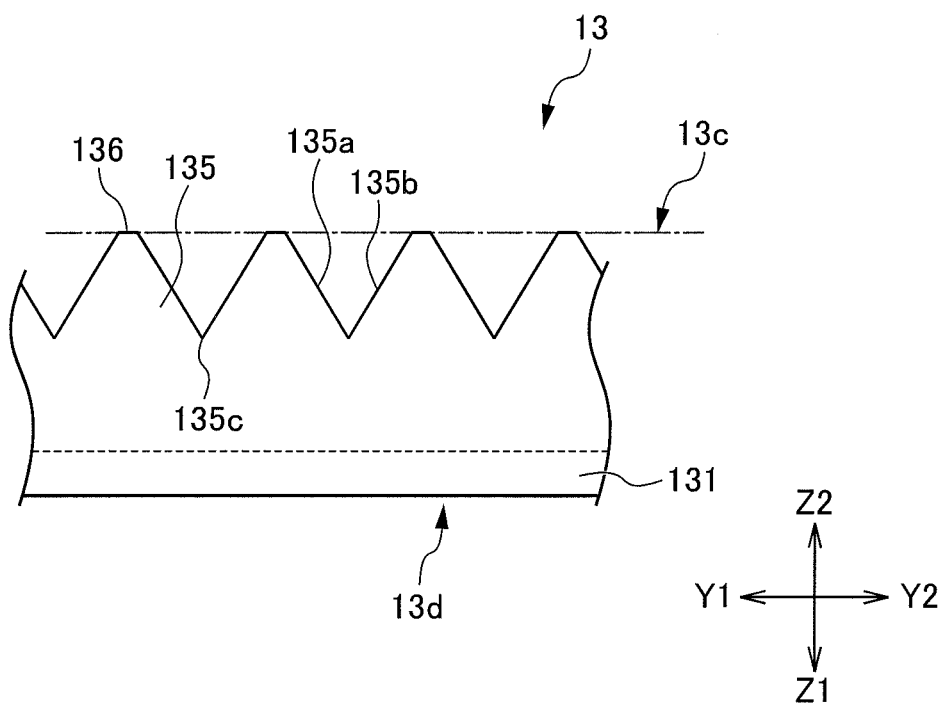
FIG. 17 is a diagram illustrating a light-emitting-side unit optical shape 135 according to a modified embodiment.
Figure 17B:
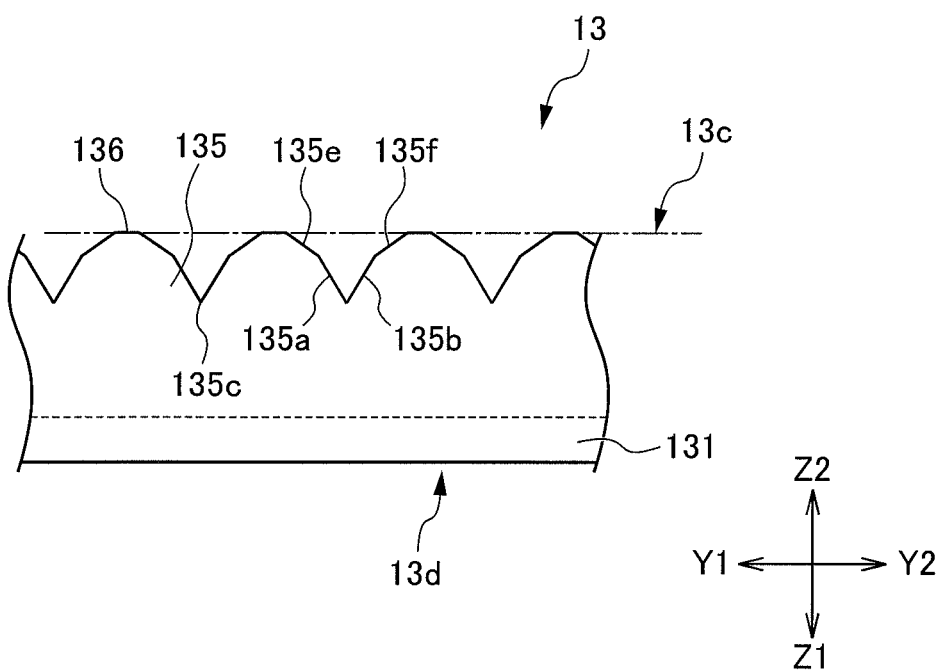
Figure 18:
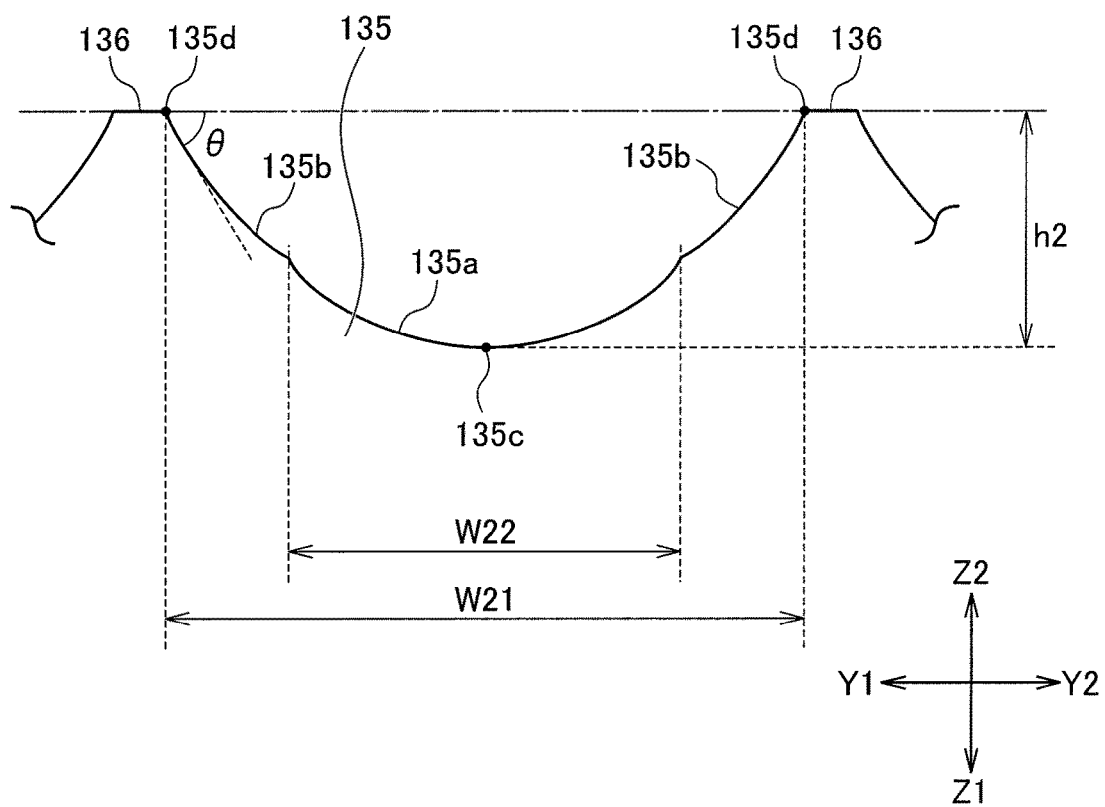
FIG. 18 is a diagram illustrating a light-emitting-side unit optical shape 135 according to a modified embodiment.
Figure 19:
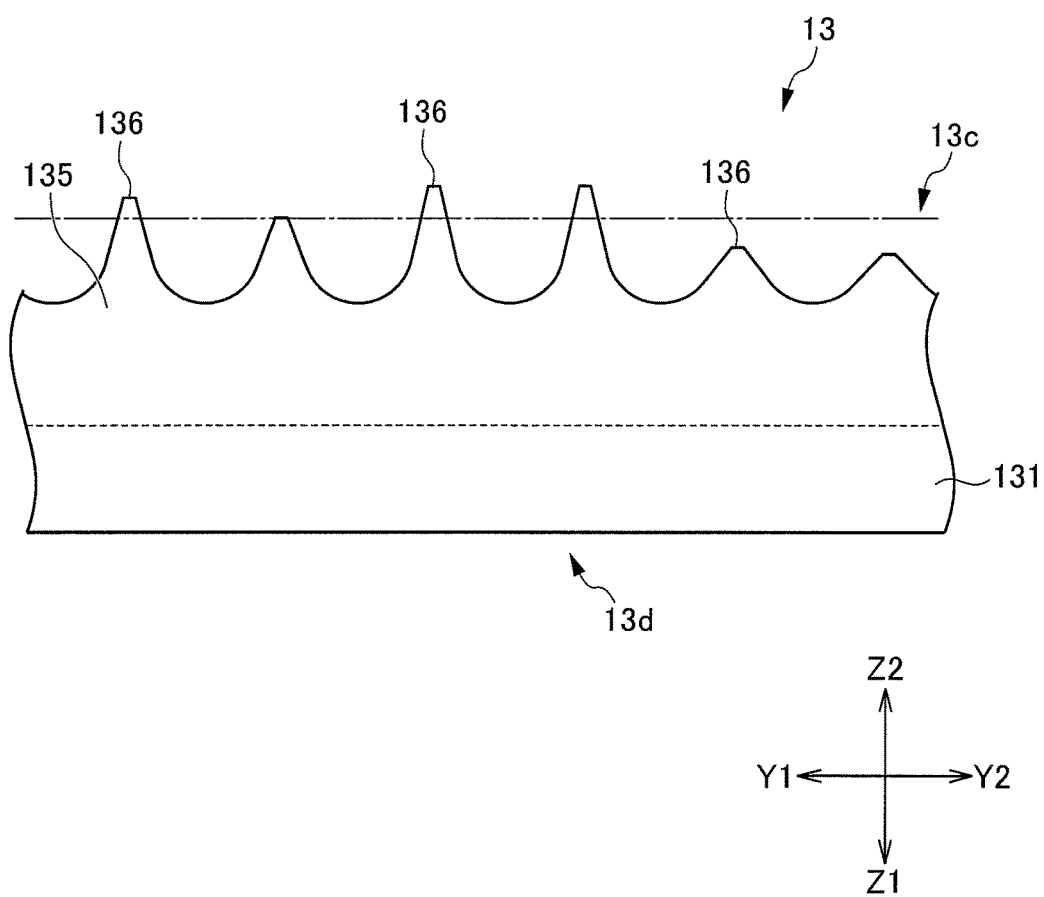
FIG. 19 is a diagram illustrating a light-emitting-side unit optical shape 135 according to a modified embodiment.

The invention is not limited to the above-described embodiments, but various modifications or changes are available. In addition, these modifications and changes are within the scope of the invention. FIG. 15 is a diagram illustrating a light-emitting-side unit optical shape according to a modified embodiment. FIG. 17 is a diagram illustrating a light-emitting-side unit optical shape according to a modified embodiment. FIG. 18 is a diagram illustrating a light-emitting-side unit optical shape according to a modified embodiment. FIG. 19 is a diagram illustrating a light-emitting-side unit optical shape according to a modified embodiment.

Figure 15A:
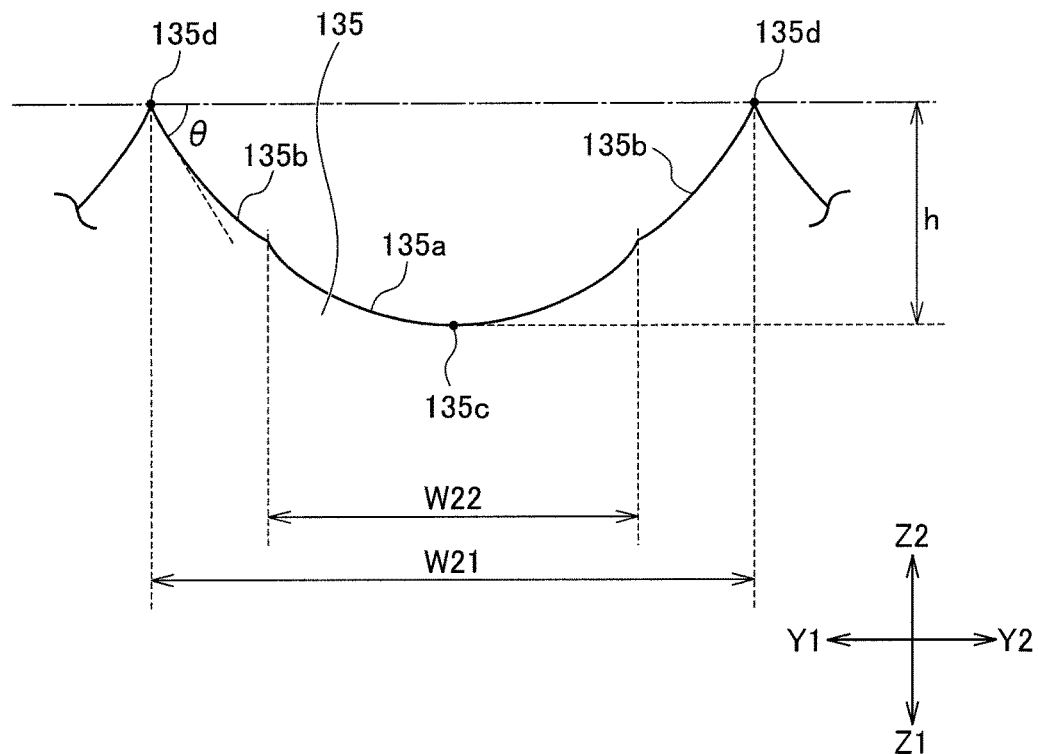
FIG. 15 is a diagram illustrating a light-emitting-side unit optical shape 135 according to a modified embodiment.

(1) In the above-described first embodiment, with respect to the light-emitting-side unit optical shape 135, the example where the inclined surface 135b is a flat surface which is inclined toward the bottom 135c side from the edge portion 135d of the groove shape is exemplified, but the invention is not limited thereto. For example, as illustrated in FIG. 15(a), the inclined surface 135b may not be flat, but the inclined surface may be formed to be a concave curved surface which is concave toward the back surface 13d side. In this case, in the light-emitting-side unit optical shape 135 of the light guide plate 13, the radius of curvature r, the maximum inclination angle θ, and the ratio R are formed within the above-described respective desired numerical ranges, so that it is possible to achieve the same effects as those of the light guide plate according to the above-described embodiments.

Figure 15B:
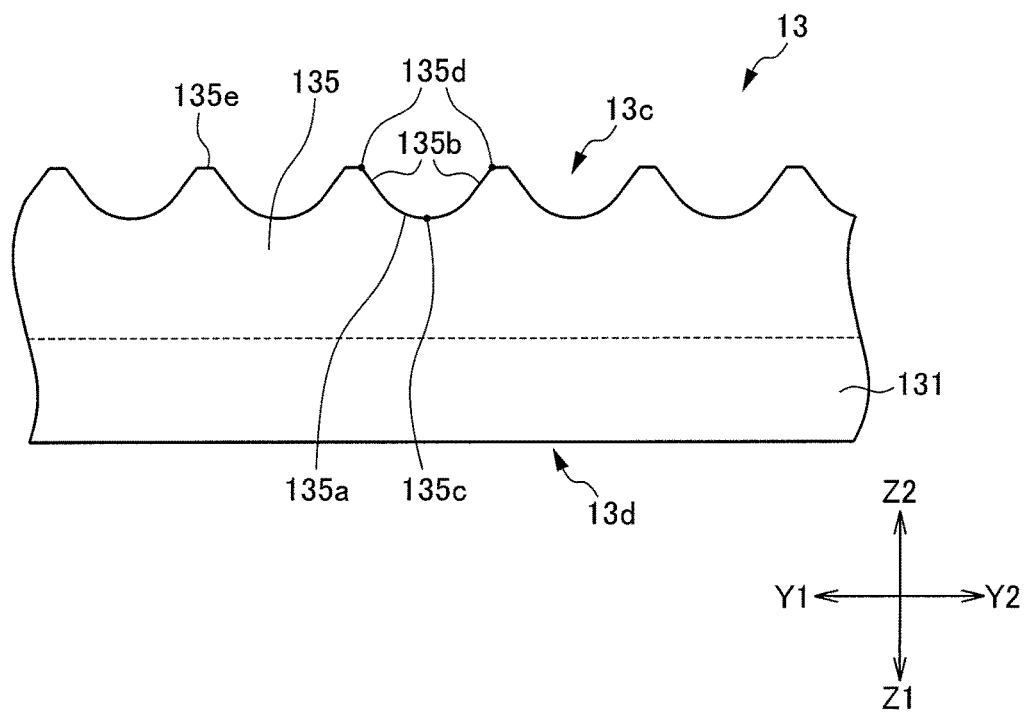

(2) In the above-described first embodiment, with respect to the light guide plate 13, the example when a plurality of the light-emitting-side unit optical shapes 135 are provided to be adjacent to each other is exemplified, but the invention is not limited thereto. For example, as illustrated in FIG. 15(b), the flat portions 135e may be provided between the light-emitting-side unit optical shapes 135. In addition, the flat portion 135e may be formed with only one plane, may be formed with a plurality of planes, and furthermore may be formed in a curved shape which is concave toward the Z1 side or is convex toward the Z2 side. In this manner, by providing the flat portions 135e, similarly to the light guide plate according to the above-described embodiment, it is possible to prevent the boundary between the adjacent light-emitting-side unit optical shapes from being sharp, and thus, it is possible to prevent the prism sheet 15 arranged in the light emitting surface side from being damaged and to prevent the boundary portion between the light-emitting-side unit optical shapes from being destroyed.

(3) In the above-described second embodiment, with respect to the light-emitting-side unit optical shape 135, the example where the bottom 135c of the groove shape is formed with the concave surface 135a which is concave toward the back surface 13d side (Z1 side) is described (refer to FIG. 10(a)), but the invention is not limited thereto. For example, as illustrated in FIG. 17(a), the light-emitting-side unit optical shape 135 may be formed so that the cross-sectional shape on the surface (YZ plane) perpendicular to the light guide direction is a triangular groove shape configured with two inclined surfaces 135a and 135b. In addition, as illustrated in FIG. 17(b), the light-emitting-side unit optical shape 135 may be formed so that the cross-sectional shape on the YZ plane is a pentagonal groove shape configured with a plurality of inclined surfaces (135a, 135b, 135e, and 135f). Even in these cases, by providing the flat portions 136 between the light-emitting-side unit optical shapes 135 (groove shapes), it is possible to achieve the same effects as those of the above-described embodiments.

(4) In the above-described second embodiment, with respect to the light-emitting-side unit optical shape 135, the example when the inclined surface 135b is a flat surface which is inclined toward the bottom 135c side from the edge portion 135d of the groove shape is exemplified, but the invention is not limited thereto. For example, as illustrated in FIG. 18, the inclined surface 135b may not be flat, but the inclined surface may be formed to be a concave curved surface which is concave toward the back surface 13d side.

(5) In the above-described second embodiment, with respect to the light-emitting-side unit optical shape 135, the example where the flat portions 136 are formed at equal height in the thickness direction of the light guide plate is exemplified, but the invention is not limited thereto. For example, as illustrated in FIG. 19, the flat portions 136 may be configured with flat portions 136a located on the light emitting surface 13c, flat portions 136b located on the side (Z2 side) closer to the light emitting side than the light emitting surface 13c, and flat portions 136c located on the side (Z1 side) closer to the back surface than the light emitting surface 13c, and thus, the flat portions having different heights may be provided. In this case, the light emitting surface 13c is located at the height which is an average height of the flat portions in the thickness direction (refer to one-dot dashed line in FIG. 19).

(6) In the above-described embodiments, with respect to the back-surface-side unit optical shape 131, the example when the top surface portion 134 is formed in a step shape by a plurality of surfaces having different heights is exemplified, but the invention is not limited thereto. The top surface portion may be formed in other shapes. For example, the top surface portion 134 may be configured with one flat surface. In addition, instead of forming the back-surface-side unit optical shapes 131, fine uneven shapes may be formed on the back surface 13d of the light guide plate 13.

(7) In the surface light source device 10, the counter surface 13b may be set as the second light incident surface 13b, and the light source unit 12 may be further arranged at the position corresponding to the surface. In this case, for example, it is preferable that the back-surface-side unit optical shapes 131 is formed to have the same shape as that of the above-described embodiment in the region from the light incident surface 13a to the central point of the light guide plate 13 in the arrangement direction, to have the shape obtained by inverting the X direction of the above-described embodiment in the region from the central point to the counter surface 13b, and to have a shape where the ratio Wb/W1 is gradually decreased (ratio Wa/W1 is gradually increased) as it goes toward the X2 side in the region from the central point to the second light incident surface 13b. In this case, the back surface of the light guide plate 13 is formed to be symmetrical with respect to a straight line parallel to the Z direction passing through the center of the cross section parallel to the XZ plane in the light guide direction.

(8) The arrangement pitch P1 of the back-surface-side unit optical shapes 131 in the arrangement direction may have a form in which the arrangement pitch is changed stepwise or continuously in the arrangement direction. In addition, similarly, the angle α may have a form in which the angle is changed stepwise or continuously in the arrangement direction of the back-surface-side unit optical shape 131. In order to achieve good optical performance, the angles α and β, the arrangement pitch P1, or the like may be appropriately set.

(9) The total thickness of the light guide plate 13 may be formed in a shape when the thickness is large on the light incident surface side (X1 side) and is gradually decreased as it goes toward the counter surface side (X2 side).

(10) With respect to the surface light source device 10, the example when the reflection sheet 14 is arranged on the back surface side (Z1 side) of the light guide plate 13 is illustrated. However, the invention is not limited thereto, but for example, instead of the reflection sheet 14, paint, a metal foil, or the like having a light reflection property may be formed on an inner surface of a casing of the transmissive display device 1 or the like, which is a surface facing the back surface 13d of the light guide plate 13 by coating, transferring, or the like.

(11) In the surface light source device 10, a combination of optical sheets having a diffusion function or other optical sheets where various lens shapes or prism shapes are formed may be arranged between the prism sheet 15 and the LCD panel 11. In addition, in the surface light source device 10, an optical sheet having a deflection function other than the prism sheet 15 may be used. Various optical sheets used in a combination with the light guide plate 13 as the surface light source device 10 may be appropriately selected to be used in accordance with the use environment or desired optical performance.

The embodiments and the modified embodiments may also be used in an appropriate combination thereof, but a detailed description thereof is omitted. In addition, the invention is not limited to the above-described embodiments or the like.

EXPLANATION OF REFERENCE NUMERALS

1: transmissive display device
10: surface light source device
11: LCD panel
12: light source unit
121: point light source
13: light guide plate
131: back-surface-side unit optical shape
132: first inclined surface portion
133: second inclined surface portion
134: top surface portion
134a to 134d: surface
135: light-emitting-side unit optical shape
135a: concave surface
135b: inclined surface
135c: bottom
135d: edge portion
136: flat portion
14: reflection sheet
15: prism sheet
16: light diffusion sheet

The invention claimed is:

1. A light guide plate having a light incident surface on which light is incident, a light emitting surface which intersects the light incident surface and emits light, and a back surface which faces the light emitting surface, the light guide plate emitting the light from the light emitting surface while guiding the incident light from the light incident surface in a light guide direction,
wherein a plurality of light-emitting-side unit optical shapes are arranged in the light emitting surface in a direction which is perpendicular to the light guide direction and is perpendicular to a thickness direction of the light guide plate,
wherein the light-emitting-side unit optical shape extends in the light guide direction and is formed in a groove shape which is recessed from the light emitting surface, and a bottom of the groove shape is formed on a concave surface which is concave toward the back surface side,
wherein flat inclined surfaces which are inclined from an edge portion where recessing from the light emitting surface is started toward the bottom side are formed in two end portions of the concave surface in an arrangement direction, and
wherein, when a width of the light-emitting-side unit optical shape in the arrangement direction is denoted by W21, a maximum inclination angle θ of the inclined surface with respect to the light emitting surface satisfies 20°≤θ≤45°, and a radius of curvature r of the concave surface satisfies r≥W21/(4×sin θ).

2. The light guide plate according to claim 1, wherein a ratio R=W22/W21 of a width W22 of the concave surface to the width W21 of the light-emitting-side unit optical shape in the arrangement direction of the light-emitting-side unit optical shape is 50%≤R≤80%.

3. The light guide plate according to claim 1, wherein a flat portion which is substantially parallel to the light emitting surface is provided between the adjacent light-emitting-side unit optical shapes.

4. The light guide plate according to claim 3, wherein a width W23 of the flat portion in the arrangement direction of the light-emitting-side unit optical shape is 0.5 μm≤W23≤2.5 μm.

5. The light guide plate according to claim 4, wherein the width W23 of the flat portion in the arrangement direction of the light-emitting-side unit optical shape is 0.5 μm≤W23≤2.0 μm.

6. The light guide plate according to claim 3, wherein at least a portion of the flat portions are different from other flat portions in a thickness direction in terms of height.

7. The light guide plate according to claim 1, wherein a plurality of back-surface-side unit optical shapes are arranged on the back surface in the light guide direction,
wherein the back-surface-side unit optical shape is convex toward a back surface side and includes a first inclined surface portion which is located in the light incident surface side, a second inclined surface portion which is located in the other side facing the first inclined surface portion to totally reflect at least a portion of the incident light, and a top surface portion which is located between the first inclined surface portion and the second inclined surface portion, and wherein the top surface portion includes a contact portion which is in contact with a reflection member which is arranged on the back surface side of the light guide plate.

8. A surface light source device comprising:

the light guide plate according to claim 1;

a light source unit which is provided at a position facing the light incident surface of the light guide plate and emits light to the light incident surface; and a deflection optical sheet which is arranged on a light emitting surface side of the light guide plate and has a deflection function of deflecting light emitted from the light guide plate to a normal direction of a sheet surface thereof or a direction where an angle with respect to the normal direction is to be decreased.

9. A transmissive display device comprising:

the surface light source device according to claim 8; and a transmissive display unit which is illuminated from a back surface side by the surface light source device.

* * * * *